United States Patent
Liu et al.

(10) Patent No.: US 10,688,599 B2
(45) Date of Patent: Jun. 23, 2020

(54) APPARATUS AND METHODS FOR LASER PROCESSING TRANSPARENT WORKPIECES USING PHASE SHIFTED FOCAL LINES

(71) Applicant: Corning Incorporated, Corning, NY (US)

(72) Inventors: Anping Liu, Horseheads, NY (US); Matthew Ryan Ross, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 347 days.

(21) Appl. No.: 15/874,004

(22) Filed: Jan. 18, 2018

(65) Prior Publication Data
US 2018/0221988 A1 Aug. 9, 2018

Related U.S. Application Data

(60) Provisional application No. 62/456,774, filed on Feb. 9, 2017.

(51) Int. Cl.
*B23K 26/53* (2014.01)
*B23K 26/364* (2014.01)
(Continued)

(52) U.S. Cl.
CPC ............ *B23K 26/53* (2015.10); *B23K 26/064* (2015.10); *B23K 26/0617* (2013.01);
(Continued)

(58) Field of Classification Search
CPC .. B23K 26/53; B23K 26/064; B23K 26/0617; B23K 26/073; B23K 26/0676;
(Continued)

(56) References Cited

U.S. PATENT DOCUMENTS

| 1,790,397 A | 1/1931 | Woods et al. |
| 2,682,134 A | 6/1954 | Stookey |

(Continued)

FOREIGN PATENT DOCUMENTS

| CN | 2388062 Y | 7/2000 |
| CN | 1283409 C | 11/2006 |

(Continued)

OTHER PUBLICATIONS

"What is the difference between Ra and RMS?"; Harrison Electropolishing LP; (http://www.harrisonep.com/electropolishingra.html), Accessed Aug. 8, 2016.

(Continued)

*Primary Examiner* — Lien M Ngo
(74) *Attorney, Agent, or Firm* — Kevin L. Bray

(57) ABSTRACT

A method for laser processing a transparent workpiece includes forming a contour line having defects in the transparent workpiece, which includes directing a pulsed laser beam oriented along a beam pathway through a beam converting element and through a phase modifying optical element such that the portion of the pulsed laser beam directed into the transparent workpiece includes a phase shifted focal line having a cross-sectional phase contour that includes phase contour ridges induced by the phase modifying optical element and extending along phase ridge lines. Moreover, the phase shifted focal line generates an induced absorption within the transparent workpiece to produce a defect within the transparent workpiece including a central defect region and a radial arm that extends outward from the central defect region in a radial defect direction oriented within 20° of the phase ridge lines of the phase shifted focal line.

24 Claims, 18 Drawing Sheets

(51) Int. Cl.
*B23K 26/0622* (2014.01)
*B23K 26/067* (2006.01)
*B23K 26/073* (2006.01)
*C03B 9/12* (2006.01)
*C03C 14/00* (2006.01)
*C03B 33/02* (2006.01)
*C03C 3/093* (2006.01)
*B23K 26/06* (2014.01)
*B23K 26/064* (2014.01)
*B23K 103/00* (2006.01)

(52) U.S. Cl.
CPC ...... *B23K 26/0624* (2015.10); *B23K 26/0676* (2013.01); *B23K 26/073* (2013.01); *B23K 26/364* (2015.10); *C03B 9/12* (2013.01); *C03B 33/0215* (2013.01); *C03B 33/0222* (2013.01); *C03C 3/093* (2013.01); *C03C 14/006* (2013.01); *B23K 2103/52* (2018.08); *B23K 2103/54* (2018.08)

(58) Field of Classification Search
CPC .............. B23K 26/0624; B23K 26/364; B23K 2103/54; B23K 2103/52; C03B 33/0222; C03B 33/0215; C03C 3/093; C03C 14/006
USPC ........ 219/121.67, 121.68–121.77; 65/56, 70, 65/97, 105, 103, 112; 264/409
See application file for complete search history.

(56) References Cited

U.S. PATENT DOCUMENTS

| | | | |
|---|---|---|---|
| 2,749,794 A | 6/1956 | O'Leary | |
| 3,647,410 A | 3/1972 | Heaton et al. | |
| 3,695,497 A | 10/1972 | Dear | |
| 3,695,498 A | 10/1972 | Dear | |
| 3,729,302 A | 4/1973 | Heaton | |
| 3,775,084 A | 11/1973 | Heaton | |
| 4,226,607 A | 10/1980 | Domken | |
| 4,441,008 A | 4/1984 | Chan | |
| 4,546,231 A | 10/1985 | Gresser et al. | |
| 4,646,308 A | 2/1987 | Kafka et al. | |
| 4,764,930 A | 8/1988 | Bille et al. | |
| 4,891,054 A | 1/1990 | Bricker et al. | |
| 4,907,586 A | 3/1990 | Bille et al. | |
| 4,918,751 A | 4/1990 | Pessot et al. | |
| 4,929,065 A | 5/1990 | Hagerty et al. | |
| 5,035,918 A | 7/1991 | Vyas | |
| 5,040,182 A | 8/1991 | Spinelli et al. | |
| 5,104,210 A | 4/1992 | Tokas | |
| 5,108,857 A | 4/1992 | Kitayama et al. | |
| 5,112,722 A | 5/1992 | Tsujino et al. | |
| 5,114,834 A | 5/1992 | Nachshon | |
| 5,265,107 A | 11/1993 | Delfyett | |
| 5,400,350 A | 3/1995 | Galvanauskas et al. | |
| 5,434,875 A | 7/1995 | Rieger et al. | |
| 5,436,925 A | 7/1995 | Lin et al. | |
| 5,553,093 A | 9/1996 | Ramaswamy et al. | |
| 5,574,597 A | 11/1996 | Kataoka et al. | |
| 5,586,138 A | 12/1996 | Yokayama | |
| 5,696,782 A | 12/1997 | Harter et al. | |
| 5,736,709 A | 4/1998 | Neiheisel | |
| 6,016,223 A | 1/2000 | Suzuki et al. | |
| 6,038,055 A | 3/2000 | Hansch et al. | |
| 6,055,829 A | 5/2000 | Witzmann et al. | |
| 6,078,599 A | 6/2000 | Everage et al. | |
| 6,156,030 A | 12/2000 | Neev | |
| 6,160,835 A | 12/2000 | Kwon | |
| 6,186,384 B1 | 2/2001 | Sawada | |
| 6,210,401 B1 | 4/2001 | Lai | |
| 6,256,328 B1 | 7/2001 | Delfyett et al. | |
| 6,259,512 B1 | 7/2001 | Mizouchi | |
| 6,272,156 B1 | 8/2001 | Reed et al. | |
| 6,301,932 B1 | 10/2001 | Allen et al. | |
| 6,322,958 B1 | 11/2001 | Hayashi | |
| 6,327,875 B1 * | 12/2001 | Allaire | B23K 26/073 219/121.67 |
| 6,339,208 B1 | 1/2002 | Rockstroh et al. | |
| 6,373,565 B1 | 4/2002 | Kafka et al. | |
| 6,381,391 B1 | 4/2002 | Islam et al. | |
| 6,396,856 B1 | 5/2002 | Sucha et al. | |
| 6,407,360 B1 | 6/2002 | Choo et al. | |
| 6,438,996 B1 | 8/2002 | Cuvelier | |
| 6,445,491 B2 | 9/2002 | Sucha et al. | |
| 6,449,301 B1 | 9/2002 | Wu et al. | |
| 6,484,052 B1 | 11/2002 | Visuri et al. | |
| 6,489,589 B1 | 12/2002 | Alexander | |
| 6,501,578 B1 | 12/2002 | Bernstein et al. | |
| 6,552,301 B2 | 4/2003 | Herman et al. | |
| 6,573,026 B1 | 6/2003 | Aitken et al. | |
| 6,592,703 B1 | 7/2003 | Habeck et al. | |
| 6,635,849 B1 | 10/2003 | Okawa et al. | |
| 6,720,519 B2 | 4/2004 | Liu et al. | |
| 6,729,161 B1 | 5/2004 | Miura et al. | |
| 6,744,009 B1 | 6/2004 | Xuan et al. | |
| 6,787,732 B1 | 9/2004 | Xuan et al. | |
| 6,800,237 B1 | 10/2004 | Yamamoto et al. | |
| 6,800,831 B1 | 10/2004 | Hoetzel | |
| 6,958,094 B2 | 10/2005 | Ohmi et al. | |
| 6,992,026 B2 | 1/2006 | Fukuyo et al. | |
| 7,009,138 B2 | 3/2006 | Amako et al. | |
| 7,061,583 B2 | 6/2006 | Mulkens et al. | |
| 7,353,829 B1 | 4/2008 | Wachter et al. | |
| 7,361,221 B2 * | 4/2008 | Matsumura | B23K 26/0648 117/92 |
| 7,511,886 B2 | 3/2009 | Schultz et al. | |
| 7,535,634 B1 | 5/2009 | Savchenkov et al. | |
| 7,626,138 B2 * | 12/2009 | Bovatsek | B23K 26/0617 219/121.69 |
| 7,633,033 B2 | 12/2009 | Thomas et al. | |
| 7,642,483 B2 | 1/2010 | You et al. | |
| 7,649,153 B2 | 1/2010 | Haight et al. | |
| 7,726,532 B2 | 6/2010 | Gonoe | |
| 8,104,385 B2 | 1/2012 | Hayashi et al. | |
| 8,118,971 B2 | 2/2012 | Hori et al. | |
| 8,132,427 B2 | 3/2012 | Brown et al. | |
| 8,168,514 B2 | 5/2012 | Garner et al. | |
| 8,245,539 B2 | 8/2012 | Lu et al. | |
| 8,245,540 B2 | 8/2012 | Abramov et al. | |
| 8,269,138 B2 | 9/2012 | Garner et al. | |
| 8,283,595 B2 | 10/2012 | Fukuyo et al. | |
| 8,292,141 B2 | 10/2012 | Cox et al. | |
| 8,296,066 B2 | 10/2012 | Zhao et al. | |
| 8,327,666 B2 | 12/2012 | Harvey et al. | |
| 8,341,976 B2 | 1/2013 | Dejneka et al. | |
| 8,347,651 B2 | 1/2013 | Abramov et al. | |
| 8,358,888 B2 | 1/2013 | Ramachandran | |
| 8,444,906 B2 | 5/2013 | Lee et al. | |
| 8,448,471 B2 | 5/2013 | Kumatani et al. | |
| 8,518,280 B2 | 8/2013 | Hsu et al. | |
| 8,549,881 B2 | 10/2013 | Brown et al. | |
| 8,584,354 B2 | 11/2013 | Cornejo et al. | |
| 8,584,490 B2 | 11/2013 | Garner et al. | |
| 8,592,716 B2 | 11/2013 | Abramov et al. | |
| 8,604,380 B2 | 12/2013 | Howerton et al. | |
| 8,607,590 B2 | 12/2013 | Glaesemann et al. | |
| 8,616,024 B2 | 12/2013 | Cornejo et al. | |
| 8,635,887 B2 | 1/2014 | Black et al. | |
| 8,680,489 B2 | 3/2014 | Martinez et al. | |
| 8,685,838 B2 | 4/2014 | Fukuyo et al. | |
| 8,697,228 B2 | 4/2014 | Carre et al. | |
| 8,720,228 B2 | 5/2014 | Li | |
| 8,826,696 B2 | 9/2014 | Brown et al. | |
| 8,852,698 B2 | 10/2014 | Fukumitsu | |
| 8,887,529 B2 | 11/2014 | Lu et al. | |
| 8,943,855 B2 | 2/2015 | Gomez et al. | |
| 8,951,889 B2 | 2/2015 | Ryu et al. | |
| 8,971,053 B2 | 3/2015 | Kariya et al. | |
| 9,138,913 B2 | 9/2015 | Arai et al. | |
| 9,227,868 B2 | 1/2016 | Matsumoto et al. | |
| 9,290,407 B2 | 3/2016 | Barefoot et al. | |
| 9,296,066 B2 | 3/2016 | Hosseini et al. | |

(56) References Cited

U.S. PATENT DOCUMENTS

| | | |
|---|---|---|
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh |
| 9,701,581 B2 | 7/2017 | Kangastupa et al. |
| 9,902,016 B2 * | 2/2018 | Kawaguchi ........ B23K 26/0736 |
| 9,914,183 B2 * | 3/2018 | Kawaguchi ........ B23K 26/0736 |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2004/0021615 A1 | 11/2004 | Postupack et al. |
| 2005/0098548 A1 * | 5/2005 | Kobayashi ......... B23K 26/0613 |
| | | 219/121.73 |
| 2005/0115938 A1 | 6/2005 | Sawaki et al. |
| 2005/0274702 A1 | 12/2005 | Deshi |
| 2006/0011593 A1 | 1/2006 | Fukuyo |
| 2006/0028728 A1 * | 2/2006 | Li ..................... G02B 26/0808 |
| | | 359/573 |
| 2006/0091283 A1 * | 5/2006 | Acker ................ B23K 26/0604 |
| | | 250/201.3 |
| 2006/0109874 A1 | 5/2006 | Shiozaki et al. |
| 2006/0127679 A1 | 6/2006 | Gulati et al. |
| 2006/0227440 A1 | 10/2006 | Glukstad |
| 2006/0289410 A1 | 12/2006 | Morita et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0099444 A1 | 5/2008 | Misawa et al. |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0320179 A1 | 12/2010 | Morita et al. |
| 2010/0326138 A1 | 12/2010 | Kumatani et al. |
| 2011/0049765 A1 | 3/2011 | Lei et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0183116 A1 | 7/2011 | Hung et al. |
| 2011/0240611 A1 | 10/2011 | Sandstrom et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0205356 A1 | 8/2012 | Pluss |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0068736 A1 | 3/2013 | Mielke et al. |
| 2013/0075480 A1 | 3/2013 | Yokogi et al. |
| 2013/0091897 A1 | 4/2013 | Fujii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0216573 A1 | 5/2013 | Hosseini et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 * | 12/2013 | Abramov ............ C03B 33/0222 |
| | | 428/155 |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Wiegel et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0361463 A1 | 12/2014 | Desimone et al. |
| 2015/0034612 A1 | 2/2015 | Hosseini et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 * | 6/2015 | Marjanovic ............ B23K 26/04 |
| | | 428/43 |
| 2015/0165560 A1 | 6/2015 | Hackert et al. |
| 2015/0165562 A1 | 6/2015 | Marjanovic et al. |
| 2015/0165563 A1 | 6/2015 | Manley et al. |

(56) References Cited

U.S. PATENT DOCUMENTS

| | | | |
|---|---|---|---|
| 2015/0166391 | A1 | 6/2015 | Marjanovic et al. |
| 2015/0166393 | A1 | 6/2015 | Marjanovic et al. |
| 2015/0166394 | A1* | 6/2015 | Marjanovic ........ B23K 26/0624 428/43 |
| 2015/0166395 | A1 | 6/2015 | Marjanovic et al. |
| 2015/0166396 | A1 | 6/2015 | Marjanovic et al. |
| 2015/0166397 | A1 | 6/2015 | Marjanovic et al. |
| 2015/0183679 | A1 | 7/2015 | Saito |
| 2015/0232369 | A1 | 8/2015 | Marjanovic et al. |
| 2015/0299018 | A1 | 10/2015 | Bhuyan et al. |
| 2015/0367442 | A1 | 12/2015 | Bovatsek et al. |
| 2016/0008927 | A1 | 1/2016 | Grundmueller et al. |
| 2016/0009066 | A1 | 1/2016 | Neiber et al. |
| 2016/0023922 | A1 | 1/2016 | Addiego et al. |
| 2016/0031745 | A1 | 2/2016 | Ortner et al. |
| 2016/0060156 | A1 | 3/2016 | Krueger et al. |
| 2016/0168396 | A1 | 6/2016 | Letocart et al. |
| 2016/0280580 | A1 | 9/2016 | Bohme |
| 2016/0290791 | A1 | 10/2016 | Buono et al. |
| 2017/0169847 | A1 | 6/2017 | Tamaki |
| 2018/0118603 | A1* | 5/2018 | Nieber ................ B23K 26/38 |

FOREIGN PATENT DOCUMENTS

| | | |
|---|---|---|
| CN | 101386466 A | 3/2009 |
| CN | 101502914 A | 8/2009 |
| CN | 201357287 Y | 12/2009 |
| CN | 101637849 A | 2/2010 |
| CN | 201471092 U | 5/2010 |
| CN | 102060437 A | 5/2011 |
| CN | 102248302 A | 11/2011 |
| CN | 102343631 A | 2/2012 |
| CN | 102649199 A | 8/2012 |
| CN | 102672355 A | 9/2012 |
| CN | 102898014 A | 1/2013 |
| CN | 102916081 A | 2/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 10346027 A | 4/2014 |
| CN | 203509350 U | 4/2014 |
| CN | 104344202 A | 2/2015 |
| DE | 2231330 A1 | 1/1974 |
| DE | 10200635555 A1 | 1/2008 |
| DE | 102012010635 A1 | 11/2013 |
| DE | 102013223637 A1 | 5/2015 |
| EP | 0270897 A1 | 6/1988 |
| EP | 0609978 A1 | 8/1994 |
| EP | 1159104 B1 | 8/2004 |
| EP | 2202545 A1 | 6/2010 |
| EP | 2783784 A2 | 10/2014 |
| FR | 298294 A1 | 10/2013 |
| GB | 1242172 | 8/1971 |
| JP | 1179770 A | 7/1989 |
| JP | 6318756 A | 11/1994 |
| JP | 09106243 A | 4/1997 |
| JP | 11269683 A | 10/1999 |
| JP | 11347758 A | 12/1999 |
| JP | 2001138083 A | 5/2001 |
| JP | 2002228818 A | 8/2002 |
| JP | 2003062756 A | 3/2003 |
| JP | 2003114400 A | 4/2003 |
| JP | 2003154517 A | 5/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 2006130691 A | 5/2006 |
| JP | 2006248885 A | 9/2006 |
| JP | 2007021548 A | 2/2007 |
| JP | 2007253203 A | 10/2007 |
| JP | 2010046761 A | 3/2010 |
| JP | 04592855 B2 | 12/2010 |
| JP | 2011049398 A | 3/2011 |
| JP | 04672689 B2 | 4/2011 |
| JP | 04880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 05274085 B2 | 8/2013 |
| JP | 05300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2009057161 A | 6/2009 |
| KR | 1020621 B1 | 3/2011 |
| KR | 2012015366 A | 2/2012 |
| KR | 2012074508 A | 7/2012 |
| KR | 2013031380 A | 3/2013 |
| KR | 1269474 B1 | 5/2013 |
| KR | 2013124646 A | 11/2013 |
| KR | 1344368 B1 | 12/2013 |
| KR | 2014022980 A | 2/2014 |
| KR | 2014022981 A | 2/2014 |
| KR | 1020140064220 A | 5/2014 |
| TW | 201226345 A | 7/2012 |
| WO | 1999029243 A1 | 6/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2011056781 A1 | 5/2011 |
| WO | 2012006736 A2 | 1/2012 |
| WO | 2012166753 A2 | 6/2012 |
| WO | 2012108052 A1 | 8/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014064492 A1 | 5/2014 |
| WO | 2014079478 A1 | 5/2014 |
| WO | 2014079570 A1 | 5/2014 |
| WO | 2015127583 A1 | 9/2015 |
| WO | 2016005455 A1 | 1/2016 |
| WO | 2016010954 A2 | 1/2016 |
| WO | 2016154284 A1 | 9/2016 |

OTHER PUBLICATIONS

"EagleEtch" Product Brochure, EuropeTec USA Inc., pp. 1-8, Aug. 1, 2014.
"PHAROS High-power femtosecond laser system" product brochure; Light Conversion, Vilnius, LT; Apr. 18, 2011, pp. 1-2.
"TruMicro 5000" Product Manual, Trumpf Laser GmbH + Co. KG, pp. 1-4, Aug. 2011.
Abakians et al."Evaporative Cutting of a Semitransparent Body With a Moving CW Laser", J. Heat Transfer 110(4a), 924-930 (Nov. 1, 1988) (7 pages) doi:10.1115/1.3250594.
Abramov et al., "Laser separation of chemically strengthened glass"; Physics Procedia 5 (2010) 285-290, Elsevier,; doi: 10.1016/j.phpro.2010.08.054.

(56) References Cited

OTHER PUBLICATIONS

Ahmed et al. "Display glass cutting by femtosecond laser induced single shot periodic void array" Applied Physics A: Materials Science and Proccessing vol. 93 No. 1 (2008) pp. 189-192.
Arimoto et al., "Imaging properties of axicon in a scanning optical system"; Applied Optics, Nov. 1, 1992, vol. 31, No. 31, pp. 6653-6657.
Bagchi et al. "Fast ion beams from intense, femtosecond laser irradiated nanostructured surfaces" Applied Physics B 88 (2007) p. 167-173.
Bhuyan et al. "Laser micro- and nanostructuring using femtosecond Bessel beams", Eur. Phys. J. Special Topics 199 (2011) p. 101-110.
Bhuyan et al. "Single shot high aspect ratio bulk nanostructuring of fused silica using chirp-controlled ultrafast laser Bessel beams" Applied Physics Letters 104 (2014) 021107.
Bhuyan et al. "Ultrafast Bessel beams for high aspect ratio taper free micromachining of glass" Proc. of SPIE vol. 7728 77281V-1.
Bhuyan et al., "Femtosecond non-diffracting Bessel beams and controlled nanoscale ablation" by IEEE (2011).
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Case Design Guidelines for Apple Devices Release R5 (https://web.archive.org/web/20131006050442/https://developer.apple.com/resources/cases/Case-Design-Guidelines.pdf ; archived on Oct. 6, 2013).
Chiao et al. 9. "Self-trapping of optical beams," Phys. Rev. Lett, vol. 13, Num. 15, p. 479 (1964).
Corning Inc., "Corning® 1737 AM LCD Glass Substrates Material Information", issued Aug. 2002.
Corning Inc., "Corning® Eagle2000 TM AMLCD Glass Substrates Material Information", issued Apr. 2005.
Couairon et al. "Femtosecond filamentation in transparent media" Physics Reports 441 (2007) pp. 47-189.
Courvoisier et al. "Applications of femtosecond Bessel beams to laser ablation" Applied Physics A (2013) 112, p. 29-34.
Courvoisier et al. "Surface nanoprocessing with non-diffracting femtosecond Bessel beams" Optics Letters vol. 34 No. 20, (2009) p. 3163-3165.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.
Dong et al. "On-axis irradiance distribution of axicons illuminated by spherical wave", Optics & Laser Technology 39 (2007) 1258-1261.
Duocastella et al. "Bessel and annular beams for material processing", Laser Photonics Rev. 6, 607-621, 2012.
Durnin. "Exact solutions for nondiffracting beams I. The scaler theory" J. Opt. Soc. Am. A. 4(4) pp. 651-654.
Eaton et al. "Heat accumulation effects in femtosecond laser written waveguides with variable repetition rates", Opt. Exp. 5280, vol. 14, No. 23, Jun. 2006.
Gattass et al. "Micromachining of bulk glass with bursts of femtosecond laser pulses at variable repetition rates" Opt. Exp. 5280, vol. 14, No. 23, Jun. 2006.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Gori et al. "Analytical derivation of the optimum triplicator" Optics Communications 157 (1998) pp. 13-16.
Herman et al., "Laser micromachining of 'transparent' fused silica with 1-ps. pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Honda et al. "A Novel Polymer Film that Controls Light Transmission", Progress in Pacific Polymer Science 3, 159-169 (1994).
http://www.gtat.com/Collateral/Documents/English-US/Sapphire/12-21-12_GT_TouchScreen_V3_web.pdf.
Hu et al. "5-axis laser cutting interference detection and correction based on STL model" (2009) Zhongguo Jiguang/Chinese Journal of Lasers, 36 (12), pp. 3313-3317.
Huang et al., "Laser etching of glass substrates by 1064 nm laser irradiation", Applied Physics, Oct. 2008, vol. 93, Issue 1, pp. 159-162.
Juodkazis S. et al. Laser induced microexplosion confined in the bulk of a sapphire crystal: evidence of multimegabar pressures., Phys. Rev. Lett. 96, 166101, 2006.
Karlsson et al. "The technology of chemical glass strengthening—a review" Glass Technol: Eur. J. Glass Sci. Technol. A (2010) 51 (2) pp. 41-54.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Kruger et al., "Femtosecond-pulse visible laser processing of transparent materials"; Applied Surface Science 96-98 (1996) 430-438.
Kruger et al., "Laser micromachining of barium aluminium borosilicate glass with pluse durations between 20 fs and 3 ps"; Applied Surface Science 127-129 (1998) 892-898.
Kruger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.
Levy et al. "Design, fabrication, and characterization of circular Dammann gratings based on grayscale lithography," Opt. Lett vol. 35, No. 6, p. 880-882 (2010).
Liu X et al. "laser ablation and micromachining with ultrashort laser pulses", IEEE J. Quantum Electronics, 22, 1706-1716, 1997.
Maeda et al, "Optical performance of angle-dependent light-control glass", Proc. SPIE 1536, Optical Materials Technology for Energy Efficiency and Solar Energy Conversion X, 138 (Dec. 1, 1991).
Mbise et al. "Angular selective window coatings: theory and experiments" J. Phys. D: Appl. Phys. 30 2103 (1997).
McGloin et al."Bessel beams: diffraction in a new light" Contemporary Physics, vol. 46 No. 1 (2005) pp. 15-28.
Merola et al. "Characterization of Bessel beams generated by polymeric microaxicons" Meas. Sci. Technol. 23 (2012) 10 pgs.
Mirkhalaf, M. et al., Overcoming the brittleness of glass through bio-inspiration and micro-achitecture, Nature Communications, 5:3166/ncomm4166(2014).
Perry et al., "Ultrashort-pulse laser machining of dielectric materials"; Journal of Applied Physics, vol. 85, No. 9, May 1, 1999, American Institute of Physics, pp. 6803-6810.
Perry et al., "Ultrashort-pulse laser machining"; UCRL-ID-132159, Sep. 1998, pp. 1-38.
Perry et al., "Ultrashort-pulse laser machining"; UCRL-JC-132159 Rev 1., Jan. 22, 1999, pp. 1-24.
Polynkin et al., "Extended filamentation with temporally chirped femtosecond Bessel-Gauss beams in air"; Optics Express, vol. 17, No. 2, Jan. 19, 2009, OSA, pp. 575-584.

(56) References Cited

OTHER PUBLICATIONS

Romero et al. "Theory of optimal beam splitting by phase gratings. II. Square and hexagonal gratings" J. Opt. Soc. A/vol. 24 No. 8 (2007) pp. 2296-2312.
Salleo A et al., Machining of transparent materials using IR and UV nanosecond laser pulses, Appl. Physics A 71, 601-608, 2000.
Serafetinides et al., "Polymer ablation by ultra-short pulsed lasers" Proceedings of SPIE vol. 3885 (2000) http://proceedings.spiedigitallibrary.org/.
Serafetinides et al., "Ultra-short pulsed laser ablation of polymers"; Applied Surface Science 180 (2001) 42-56.
Shah et al. "Micromachining with a high repetition rate femtosecond fiber laser", Journal of Laser Micro/Nanoengineering vol. 3 No. 3 (2008) pp. 157-162.
Shealy et al. "Geometric optics-based design of laser beam shapers",Opt. Eng. 42(11), 3123-3138 (2003). doi:10.1117/1.1617311.
Stoian et al. "Spatial and temporal laser pulse design for material processing on ultrafast scales" Applied Physics A (2014) 114, p. 119-127.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Thiele, "Relation between catalytic activity and size of particle" Industrial and Egineering Chemistry, vol. 31 No. 7, pp. 916-920.
Toytman et al. "Optical breakdown in transparent media with adjustable axial length and location", Optics Express vol. 18 No. 24, 24688-24698 (2010).
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Velpula et al.. "Ultrafast imaging of free carriers: controlled excitation with chirped ultrafast laser Bessel beams", Proc. of SPIE vol. 8967 896711-1 (2014).
Wang et al, "Investigation on CO2 laser irradiation inducing glass strip peeling for microchannel formation", Biomicrofluidics 6, 012820 (2012).
Wu et al. "Optimal orientation of the cutting head for enhancing smoothness movement in three-dimensional laser cutting" (2013) Zhongguo Jiguang/Chinese Journal of Lasers, 40 (1), art. No. 0103005.
Xu et al. "Optimization of 3D laser cutting head orientation based on the minimum energy consumption" (2014) International Journal of Advanced Manufacturing Technology, 74 (9-12), pp. 1283-1291.
Yan et al. "Fiber structure to convert a Gaussian beam to higher-order optical orbital angular momentum modes" Optics Letters vol. 37 No. 16 (2012) pp. 3294-3296.
Yoshino et al., "Micromachining with a high repetition rate femtosecond fiber laser"; JLMN—Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.

\* cited by examiner

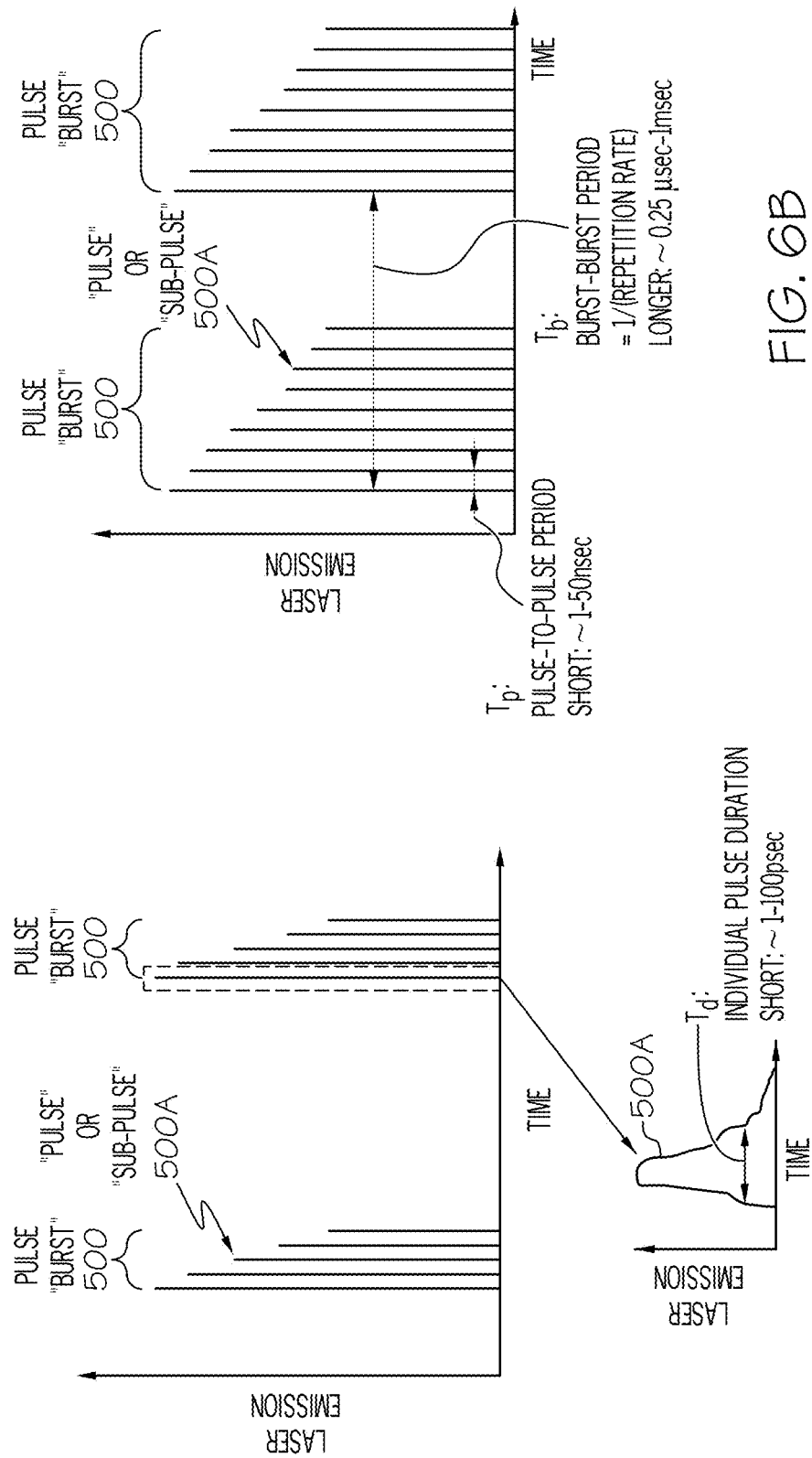

APPARATUS AND METHODS FOR LASER PROCESSING TRANSPARENT WORKPIECES USING PHASE SHIFTED FOCAL LINES

This application claims the benefit of priority under 35 U.S.C. § 119 of U.S. Provisional Application Ser. No. 62/456,774 filed on Feb. 9, 2017 the content of which is relied upon and incorporated herein by reference in its entirety.

BACKGROUND

Field

The present specification generally relates to apparatuses and methods for laser processing transparent workpieces, and more particularly, to forming contour lines in transparent workpieces for separating transparent workpieces.

Technical Background

The area of laser processing of materials encompasses a wide variety of applications that involve cutting, drilling, milling, welding, melting, etc. of different types of materials. Among these processes, one that is of particular interest is cutting or separating different types of transparent substrates in a process that may be utilized in the production of materials such as glass, sapphire, or fused silica for thin film transistors (TFT) or display materials for electronic devices.

From process development and cost perspectives there are many opportunities for improvement in cutting and separating glass substrates. It is of great interest to have a faster, cleaner, cheaper, more repeatable, and more reliable method of separating glass substrates than what is currently practiced in the market. Accordingly, a need exists for alternative improved methods for separating glass substrates.

SUMMARY

According to one embodiment, a method for laser processing a transparent workpiece includes forming a contour line in the transparent workpiece, the contour line including defects in the transparent workpiece. Forming the contour line includes directing a pulsed laser beam oriented along a beam pathway and output by a beam source through a beam converting element and directing the pulsed laser beam through a phase modifying optical element and into the transparent workpiece such that the portion of the pulsed laser beam directed into the transparent workpiece includes a phase shifted focal line having a cross-sectional phase contour transverse a beam propagation direction of the pulsed laser beam. Further, the cross-sectional phase contour includes one or more phase contour ridges induced by the phase modifying optical element, the one or more phase contour ridges extending along one or more phase ridge lines. Moreover, the phase shifted focal line generates an induced absorption within the transparent workpiece, the induced absorption producing a defect within the transparent workpiece including a central defect region and at least one radial arm that extends outward from the central defect region in a radial defect direction oriented within 20° of the one or more phase ridge lines of the phase shifted focal line.

In another embodiment, a method for laser processing a transparent workpiece including localizing a pulsed laser beam in the transparent workpiece, the pulsed laser beam propagating along an optical pathway in a beam propagation direction and having a pulse energy and pulse duration sufficient to exceed a damage threshold of the transparent workpiece and a phase shifted focal line that projects an axisymmetric beam spot onto an imaging surface of the transparent workpiece and has a cross-sectional phase contour at the axisymmetric beam spot. Further, the cross-sectional phase contour includes one or more phase contour ridges extending along the cross-sectional phase contour along a phase ridge line. Moreover, the phase shifted focal line generates an induced absorption within the transparent workpiece, the induced absorption producing a defect within the transparent workpiece having a central defect region and at least one radial arm that extends outward from the central defect region in a radial defect direction oriented within 20° of the one or more phase ridge lines of the phase shifted focal line.

In yet another embodiment, a method for laser processing a transparent workpiece includes forming a contour line in the transparent workpiece, the contour line including defects in the transparent workpiece. Forming the contour line includes directing a pulsed laser beam oriented along a beam pathway and output by a beam source through an aspheric optical element and directing the pulsed laser beam through a phase modifying optical element and into the transparent workpiece such that the portion of the pulsed laser beam directed into the transparent workpiece includes a phase shifted focal line. The phase shifted focal line includes a leading portion phase shifted from a trailing portion such that the leading portion of the phase shifted focal line irradiates the transparent workpiece before the trailing portion of the phase shifted focal line irradiates the transparent workpiece. Further, the phase shifted focal line generates an induced absorption within the transparent workpiece, the induced absorption producing a defect within the transparent workpiece including a central defect region and at least one radial arm that extends outward from the central defect region in a radial defect direction. Moreover, the phase shifted focal line projects an axisymmetric beam spot onto an imaging surface of the transparent workpiece.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6A graphically depicts the relative intensity of laser pulses within an exemplary pulse burst vs. time, according to one or more embodiments described herein, according to one or more embodiments described herein;

FIG. 6B graphically depicts relative intensity of laser pulses vs. time within another exemplary pulse burst, according to one or more embodiments described herein;

DETAILED DESCRIPTION

Figure 1A:
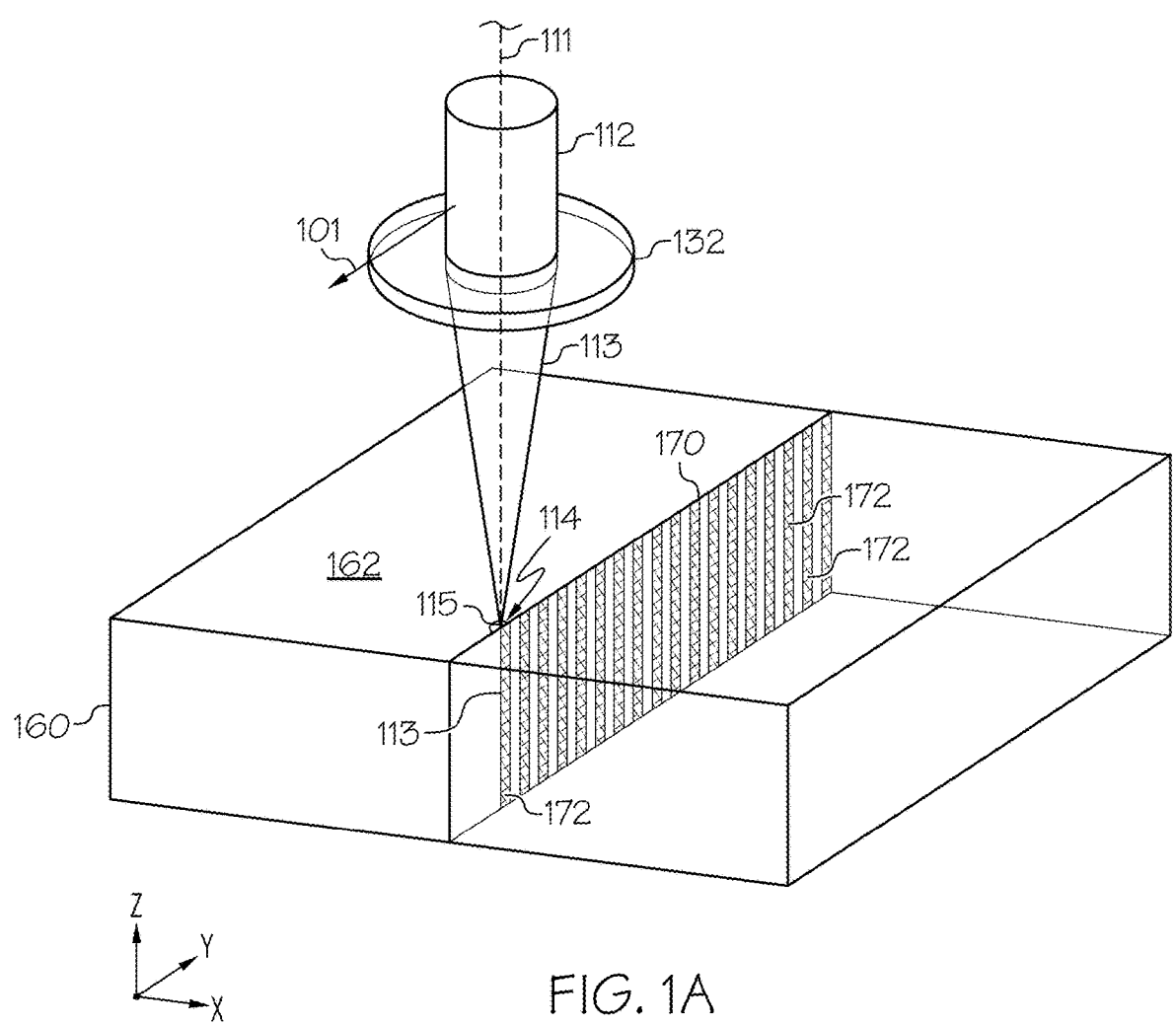
FIG. 1A schematically depicts the formation of a contour line of defects, according to one or more embodiments described herein.

Reference will now be made in detail to embodiments of processes for laser processing transparent workpieces, such as glass workpieces, examples of which are illustrated in the accompanying drawings. Whenever possible, the same reference numerals will be used throughout the drawings to refer to the same or like parts. According to one or more embodiments described herein, a transparent workpiece may be laser processed to form a contour line in the transparent workpiece comprising a series of defects that define a desired separation of the transparent workpiece into two or more portions. According to one embodiment, a pulsed laser outputs a pulsed laser beam through one or more optical components such that the pulsed laser beam projects a phase shifted focal line having a cross-sectional phase contour with one or more phase contour ridges extending along a phase ridge line. The phase shifted focal line may be utilized to create a series of defects in the transparent workpiece thereby defining the contour line. These defects may be referred to, in various embodiments herein, as line defects, perforations, or nano-perforations in the workpiece. Further, these defects may include a central defect region and radial arms that primarily form in a radial defect direction corresponding with one or more phase ridge lines of the phase shifted focal line (e.g., oriented within about 30° of the one or more phase ridge lines, for example, within about 20° of the one or more phase ridge lines, 10° of the one or more phase ridge lines, 5° of the one or more phase ridge lines, or the like, for example, parallel to the one or more phase ridge lines). In some embodiments, the process may further include separating the transparent workpiece along the contour line, for example, using an infrared laser or other laser configured to heat the area of the transparent workpiece adjacent to the contour line or to bend, scribe, or otherwise mechanically stress the transparent workpiece. In other embodiments, the transparent workpiece may be mechanically stressed to cause separation, or separation may occur spontaneously. While not intended to be limited by theory, stressing the transparent workpiece at the contour line may propagate a crack along the contour line. By controlling the direction of the radial arms of each defect along the contour line, the crack propagation may be better controlled. Various embodiments of methods and apparatuses for processing a transparent workpiece will be described herein with specific reference to the appended drawings.

The phrase "transparent workpiece," as used herein, means a workpiece formed from glass or glass-ceramic which is transparent, where the term "transparent," as used herein, means that the material has an optical absorption of less than about 20% per mm of material depth, such as less than about 10% per mm of material depth for the specified pulsed laser wavelength, or such as less than about 1% per mm of material depth for the specified pulsed laser wavelength. According to one or more embodiments, the transparent workpiece may have a thickness of from about 50 microns to about 10 mm (such as from about 100 microns to about 5 mm, or from about 0.5 mm to about 3 mm).

According to one or more embodiments, the present disclosure provides methods for processing workpieces. As used herein, "laser processing" may include forming contour lines in workpieces, separating workpieces, or combinations thereof. Transparent workpieces may comprise glass workpieces formed from glass compositions, such as borosilicate glass, soda-lime glass, aluminosilicate glass, alkali aluminosilicate glass, alkaline earth aluminosilicate glass, alkaline earth boro-aluminosilicate glass, fused silica, or crystalline materials such as sapphire, silicon, gallium arsenide, or combinations thereof. In some embodiments, the glass may be ion-exchangeable, such that the glass composition can undergo ion-exchange for mechanical strengthening before or after laser processing the transparent workpiece. For example, the transparent workpiece may comprise ion exchanged and ion exchangeable glass, such as Corning Gorilla® Glass available from Corning Incorporated of Corning, N.Y. (e.g., code 2318, code 2319, and code 2320). Further, these ion exchanged glasses may have coefficients of thermal expansion (CTE) of from about 6 ppm/° C. to about 10 ppm/° C. In some embodiments, the glass composition of the transparent workpiece may include greater than about 1.0 mol. % boron and/or compounds containing boron, including, without limitation, $B_2O_3$. In another embodiment, the glass compositions from which the transparent workpieces are formed include less than or equal to about 1.0 mol. % of oxides of boron and/or compounds containing boron. Moreover, the transparent workpiece may comprise other components which are transparent to the wavelength of the laser, for example, crystals such as sapphire or zinc selenide.

Some transparent workpieces may be utilized as display and/or TFT (thin film transistor) substrates. Some examples of such glasses or glass compositions suitable for display or TFT use are EAGLE XG®, CONTEGO, and CORNING LOTUS™ available from Corning Incorporated of Corning, N.Y. The alkaline earth boro-aluminosilicate glass compositions may be formulated to be suitable for use as substrates for electronic applications including, without limitation, substrates for TFTs. The glass compositions used in conjunction with TFTs typically have CTEs similar to that of silicon (such as less than $5 \times 10^{-6}$/K, or even less than $4 \times 10^{-6}$/K, for example, approximately $3 \times 10^{-6}$/K, or about $2.5 \times 10^{-6}$/K to about $3.5 \times 10^{-6}$/K), and have low levels of alkali within the glass. Low levels of alkali (e.g., trace amounts of about 0 wt. % to 2 wt. %, such as less than 1 wt. %, for example, less than 0.5 wt. %) may be used in TFT applications because alkali dopants, under some conditions, leach out of glass and contaminate or "poison" the TFTs, possibly rendering the TFTs inoperable. According to embodiments, the laser cutting processes described herein may be used to separate transparent workpieces in a controlled fashion with negligible debris, minimum defects, and low subsurface damage to the edges, preserving workpiece integrity and strength.

The phrase "contour line," as used herein, denotes a line (e.g., a line, a curve, etc.) formed along a desired separation line on the surface of a transparent workpiece along which a transparent workpiece will be separated into multiple portions upon exposure to the appropriate processing conditions. The contour line generally consists of one or more defects introduced into the transparent workpiece using various techniques. As used herein, a "defect" may include an area of modified material (relative to the bulk material), void space, scratch, flaw, hole, or other deformities in the transparent workpiece which enables separation spontaneously or by additional processing, such as by infrared laser processing, mechanical stress, or other separation processes. Moreover, each defect may comprise a central defect region and one or more radial arms extending outward from the central defect region along an imaging surface of the transparent workpiece. As used herein the "imaging surface" of the transparent workpiece is the surface of the transparent workpiece at which the pulsed laser beam initially contacts the transparent workpiece.

As described in more detail below, the radial orientation of the one or more radial arms may be controlled by the orientation of the cross-sectional phase contour of the phase shifted focal line that irradiates the transparent workpiece. As one example, a pulsed laser beam comprising a phase shifted focal line comprising one or more phase contour ridges extending along one or more phase ridge lines may irradiate the imaging plane of the transparent workpiece to generate defects that comprise a central defect region and one or more radial arms extending from the central defect region in a radial defect direction corresponding with the one or more phase ridge lines, for example, oriented within about 30° of the one or more phase ridge lines, for example, within about 20° of the one or more phase ridge lines, 10° of the one or more phase ridge lines, 5° of the one or more phase ridge lines, or the like, for example, parallel to the one or more phase ridge lines. Further, the central defect region may be substantially co-located with a center of a beam spot projected onto the imaging surface of the transparent workpiece by the phase shifted focal line.

A transparent workpiece, such as a glass substrate or the like, may be separated into multiple portions by first forming a contour line on the surface of the workpiece and, thereafter, heating, for example, using an infrared laser, the surface of the workpiece on the contour line to create stresses in the workpiece, such as thermal stresses. The stresses ultimately lead to separation of the workpiece along the contour line. Further, when each defect is formed using a pulsed laser beam having a phase shifted focal line oriented such that the one or more phase contour ridges of the cross-sectional phase contour extend along or approximately parallel to one or more phase ridge lines that extend substantially along or approximately parallel to the desired separation line, crack propagation caused by stressing defects in the transparent workpiece along the contour line may extend in the desired separation line. Forming defects having radial arms that extend in the direction of the desired separation line may allow the defects to be spaced apart at larger spacing distances than defects having randomly extending radial arms or no radial arms, without damage to the edges of the separated transparent workpieces where the contour line existed prior to separation. Moreover, forming defects having radial arms that extend in a radial defect direction along the direction of the desired separation line allows crack propagation to be generated by less stress, e.g., less energy, such as thermal energy, applied to the workpiece, limiting damage to the edges of the separated transparent workpieces where the contour line existed prior to separation. In contrast, when defects include randomly extending radial arms or no radial arms, cracks may propagate from the separated edge in a direction generally perpendicular to the edge of the separated transparent workpiece (i.e., generally perpendicular to the desired separation line denoted by the contour line) which weaken the edges of separated transparent workpiece.

Figure 1B:
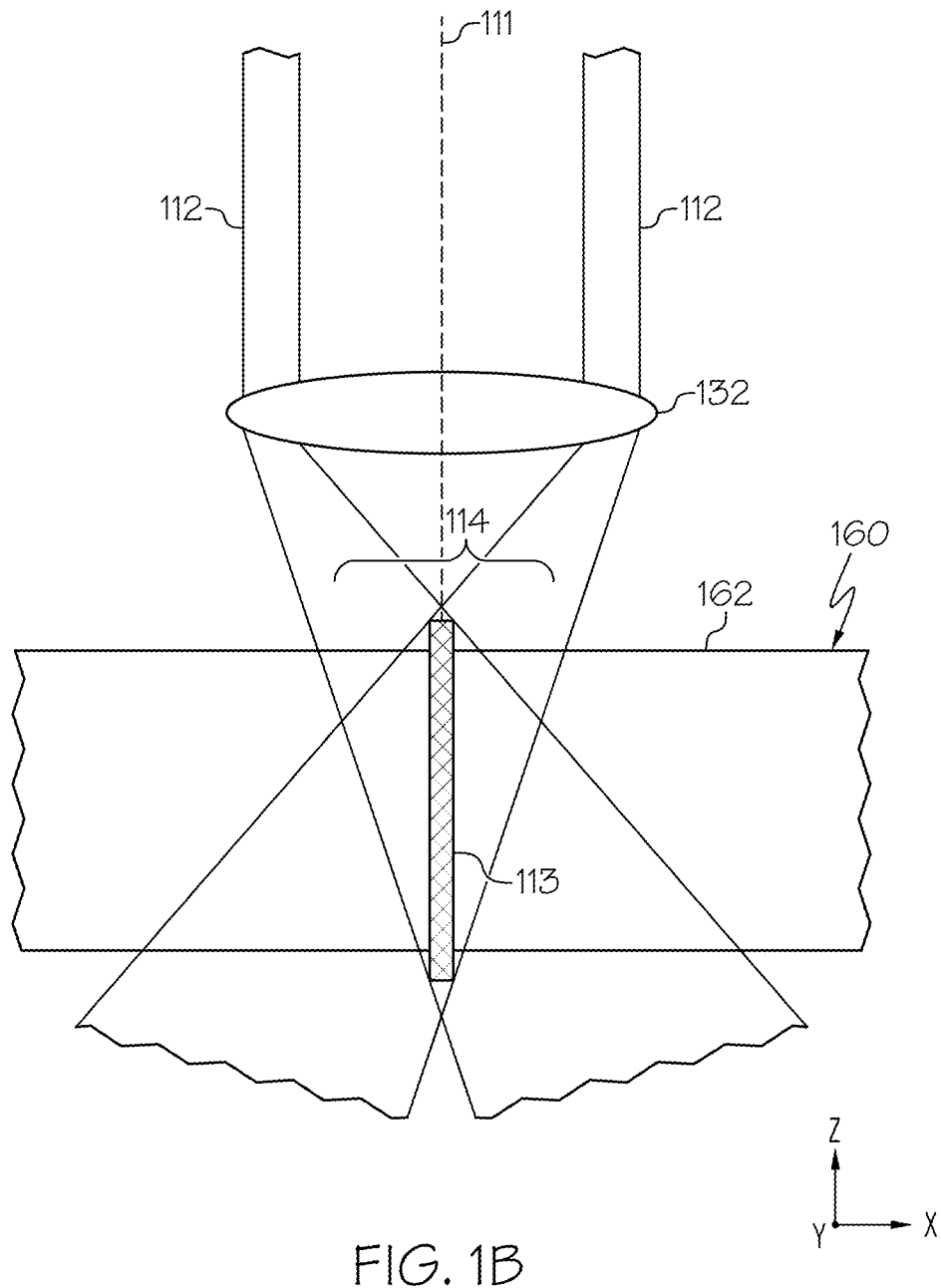
FIG. 1B schematically depicts an example phase shifted focal line during processing of a transparent workpiece, according to one or more embodiments described herein.

Referring now to FIGS. 1A and 1B by way of example, a transparent workpiece 160, such as a glass workpiece or a glass-ceramic workpiece, is schematically depicted undergoing processing according to the methods described herein. FIGS. 1A and 1B depict the formation of a contour line 170 in the transparent workpiece 160, which may be formed by translating a pulsed laser beam 112 relative to the transparent workpiece in a translation direction 101. FIGS. 1A and 1B depict the pulsed laser beam 112 along a beam pathway 111 and oriented such that the pulsed laser beam 112 may be focused into a phase shifted focal line 113 within the transparent workpiece 160 using a phase modifying optical element 140, for example, one or more lenses 130 (e.g., a first focusing lens 132 as described below). Further, the phase shifted focal line 113 is a portion of a quasi non-diffracting beam, as defined in more detail below.

FIGS. 1A and 1B depict that the pulsed laser beam 112 forms a beam spot 114 projected onto an imaging surface 162 of the transparent workpiece 160. As also used herein "beam spot" refers to an intensity cross section of a laser beam (e.g., the pulsed laser beam 112) at a point of first contact with a workpiece (e.g., the transparent workpiece 160). In some embodiments, the phase shifted focal line 113 may comprise an axisymmetric intensity cross section in a direction normal the beam pathway 111 (e.g., an axisymmetric beam spot) and in other embodiments, the phase shifted focal line 113 may comprise a non-axisymmetric intensity cross section in a direction normal the beam pathway 111 (e.g., a non-axisymmetric beam spot). As used herein, axisymmetric refers to a shape that is symmetric, or appears the same, for any arbitrary rotation angle made about a central axis, and "non-axisymmetric" refers to a shape that is not symmetric for any arbitrary rotation angle made about a central axis. A circular beam spot is an example of an axisymmetric beam spot and an elliptical beam spot is an example of a non-axisymmetric beam spot. The rotation axis (e.g., the central axis) is most often taken as being the propagation axis of the laser beam (e.g., the beam pathway 111). Further, the beam spot 114 comprises a cross sectional center 115 which is the location of peak intensity of the beam spot 114 and may be at or near a geometric center of the beam spot. The peak intensity of the beam spot 114 may be the peak intensity of a Gauss-Bessel beam, as graphically depicted in FIG. 2C, below. Example pulsed laser beams comprising a non-axisymmetric beam cross section are described in more detail in U.S. Provisional Pat. App. No. 62/402,337, titled "Apparatus and Methods for Laser Processing Transparent Workpieces Using Non-Axisymmetric Beam Spots," herein incorporated by reference in its entirety.

Figure 2A:
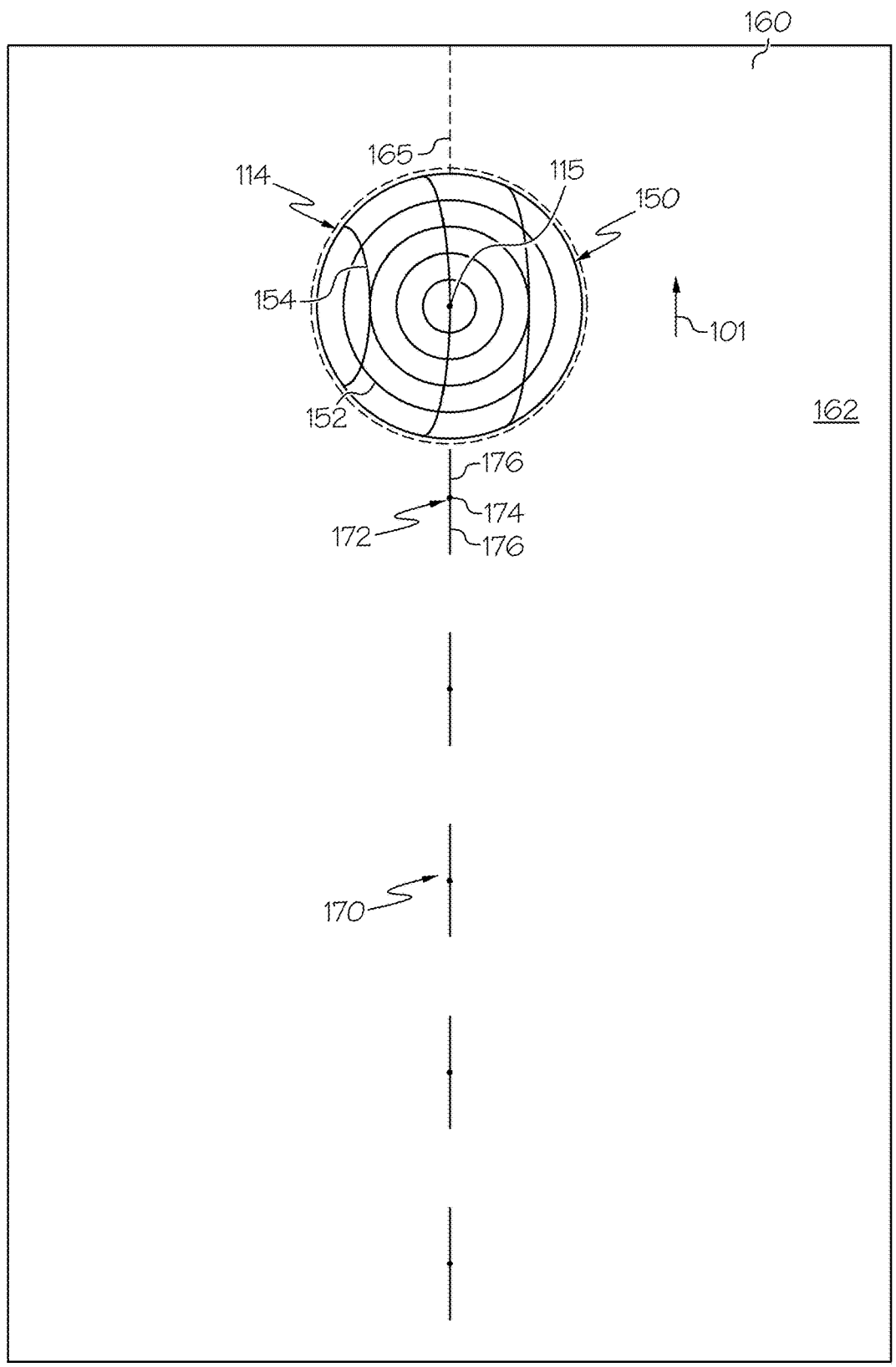
FIG. 2A schematically depicts a beam spot and a cross-sectional phase contour with one or more phase contour ridges traversing a desired separation line to form a contour line in a transparent workpiece, according to one or more embodiments described herein.

Referring also to FIG. 2A, the contour line 170 extends along the desired separation line 165 and delineates a line of intended separation about which the transparent workpiece 160 may be separated into two or more portions. The contour line 170 comprises a plurality of defects 172 that extend into the surface of the transparent workpiece 160 and establish a path for crack propagation for separation of the transparent workpiece 160 into separate portions along the contour line 170. While the contour line 170 is depicted in FIG. 1A and FIG. 2A as being substantially linear, it should be understood that other configurations are contemplated and possible including, without limitation, curves, patterns, regular geometric shapes, irregular shapes, and the like.

As depicted in FIG. 2A, each defect 172 includes a central defect region 174 and one or more radial arms 176 extending outward in a direction substantially perpendicular to the beam pathway 111 (e.g., in the X and/or Y-directions as shown in FIGS. 1A, 1B, and 2A). In operation, after the defects 172 of the contour line 170 are formed, for example, using the methods and systems described herein, the defects 172 may be further acted upon in a subsequent separating step to induce separation of the transparent workpiece 160 along the contour line 170. The subsequent separating step may include using mechanical force, thermal stress induced force, or a spontaneous break occurring due to stress present in the transparent workpiece, depending on the type, thickness, and structure of the transparent workpiece 160. For example, stress may be present in the transparent workpiece 160 which may cause spontaneous separation without further heating or mechanical separation steps.

Referring to FIGS. 1A, 1B, and 2A, in the embodiments described herein, a pulsed laser beam 112 (with the beam spot 114 projected onto the transparent workpiece 160) may be directed onto the transparent workpiece 160 (e.g., condensed into a high aspect ratio line focus that penetrates through at least a portion of the thickness of the transparent workpiece 160). This forms a pulsed laser beam focal line such as the phase shifted focal line 113. Further, the beam spot 114 is an example intensity cross section of the phase shifted focal line 113 and the phase shifted focal line 113 also comprises the cross-sectional phase contour 150 when the phase shifted focal line 113 irradiates the transparent workpiece 160 and penetrates at least a portion of the transparent workpiece 160. As used herein, "cross-sectional phase contour," refers to a cross-sectional phase distribution of the phase shifted focal line 113 orthogonal to the beam propagation direction of the pulsed laser beam 112. One example cross-sectional phase contour 150 is formed at the beam spot 114. Moreover, while the beam spot 114 and the cross-sectional phase contour 150 may be formed at the same location (e.g., on the imaging plane 162 of the transparent workpiece 160) it should be understood that the beam spot 114 is an example intensity cross section of the phase shifted focal line 113 and the cross-sectional phase contour 150 is an example cross-sectional phase distribution of the phase shifted focal line 113. For example, in the embodiments depicted in FIGS. 2A and 2B, the cross-sectional phase contour 150 is depicted overlaid on the beam spot 114 as they are each properties of a physical cross section of the pulsed laser beam focal line 113 and are representative of the intensity and phase distribution of the pulsed laser beam focal line 113.

Further, the pulsed laser beam 112 may be translated relative to the transparent workpiece 160 (e.g., in a translation direction 101) to form the plurality of defects 172 of the contour line 170. Directing or localizing the pulsed laser beam 112 into the transparent workpiece 160 causes portions of the transparent workpiece 160 to fracture, for example, depositing enough energy to break chemical bonds in the transparent workpiece 160 at spaced locations along the desired separation line 165 to form the defects 172. According to one or more embodiments, the pulsed laser beam 112 may be translated across the transparent workpiece 160 by motion of the transparent workpiece 160 (e.g., motion of a translation stage 190 coupled to the transparent workpiece 160), motion of the pulsed laser beam 112 (e.g., motion of the phase shifted focal line 113), or motion of both the transparent workpiece 160 and the phase shifted focal line 113. By translating the phase shifted focal line 113 relative to the transparent workpiece 160, the plurality of defects 172 may be formed in the transparent workpiece 160.

Figure 2B:
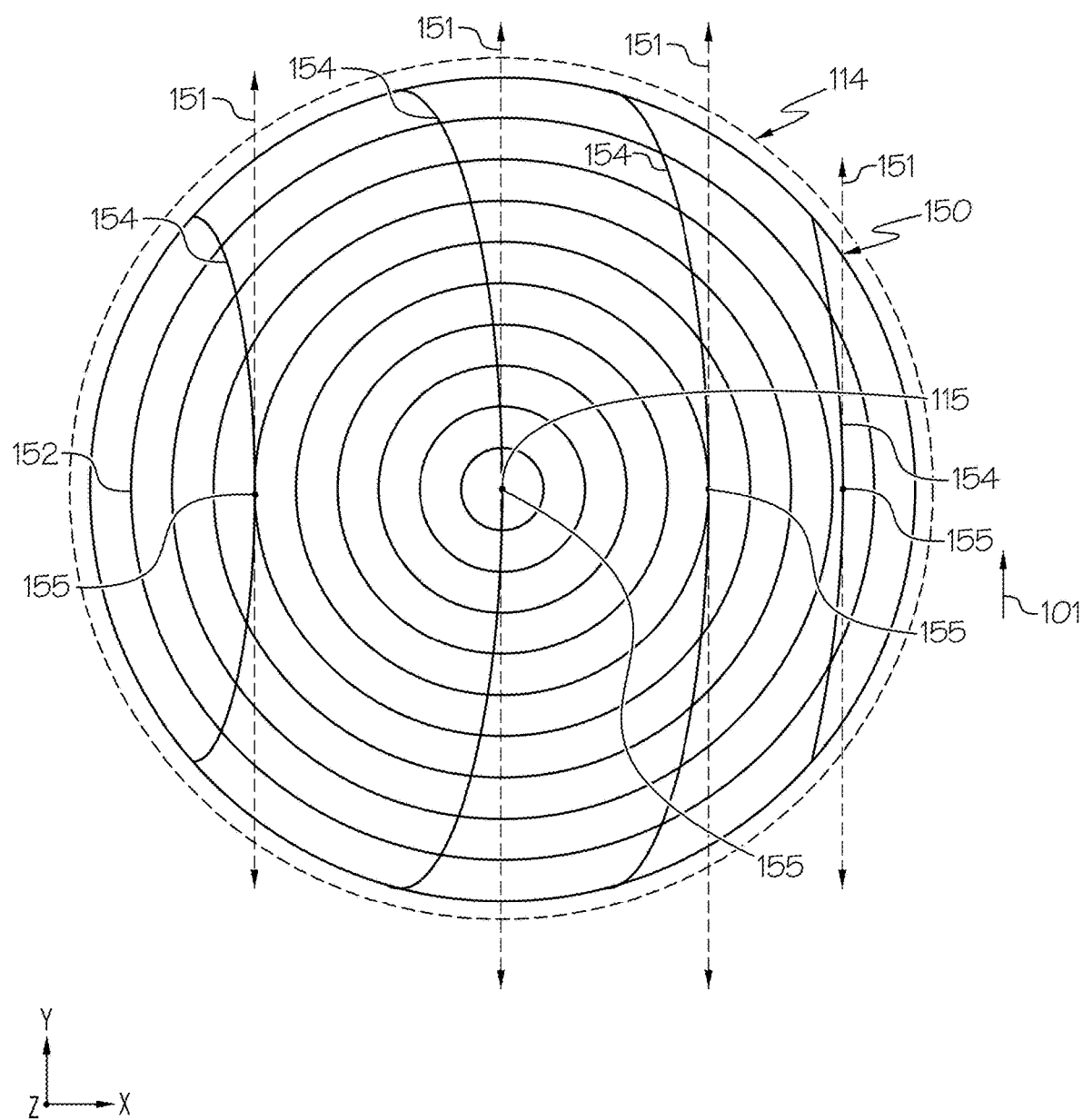
FIG. 2B schematically depicts the beam spot and the cross-sectional phase contour with the one or more phase contour ridges, according to one or more embodiments described herein.

Referring now to FIGS. 2A and 2B, the cross-sectional phase contour 150 of the phase shifted focal line 113 comprises a plurality of radial phase rings 152 and may further comprise one or more phase contour ridges 154. The radial phase rings 152 are a plurality of radially symmetric concentric phase contours. Further, the radial phase rings 152 comprise increasingly larger radii. The radial spacing distance between each adjacent radial phase ring 152 indicates the relative slope of the phase. In the embodiments depicted in FIGS. 2A and 2B, the radial spacing distance is constant, which indicates a constant relative phase slope, however, in other embodiments, the radial spacing distance may vary. While not intended to be limited by theory, it is believed that the plurality of radial phase rings 152 are induced by directing the pulsed laser beam 112 through a beam converting element 120 (e.g., through an aspheric optical element 122, such as an axicon lens), depicted in FIGS. 3-5.

Figure 2C:
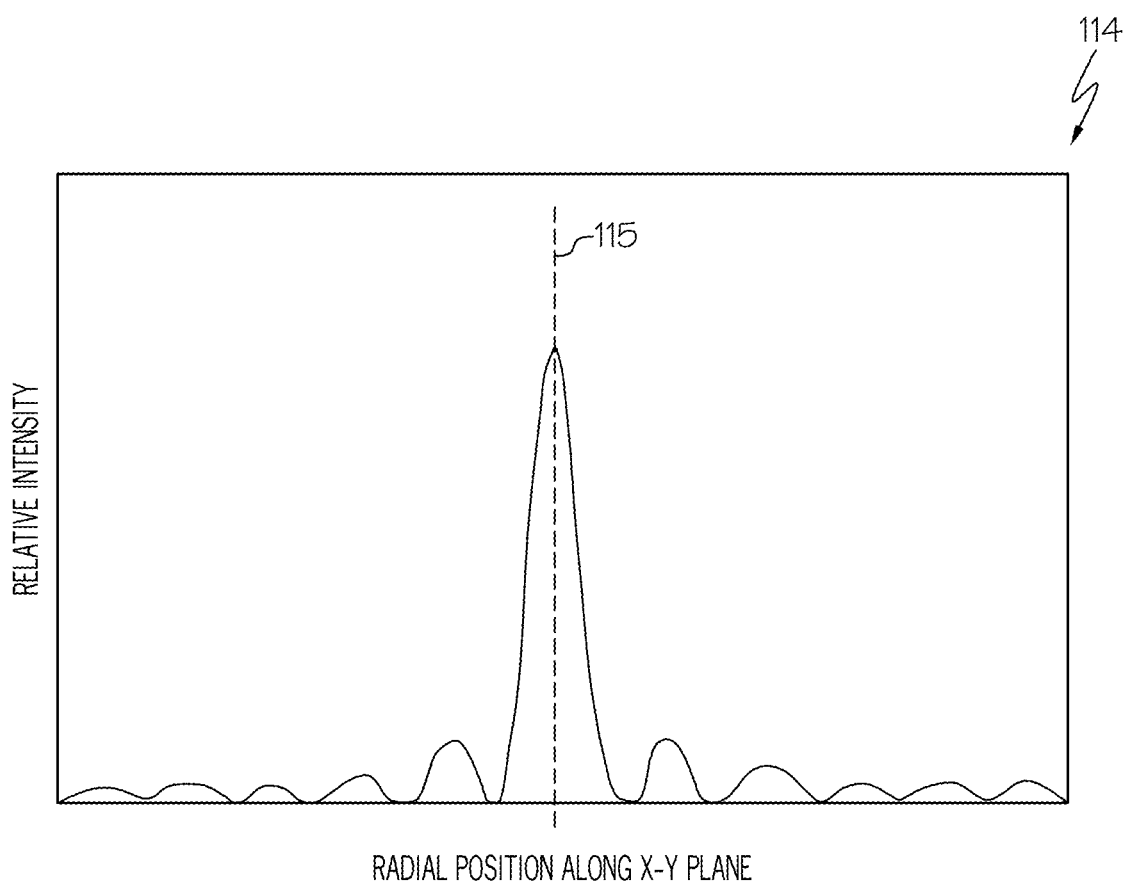
FIG. 2C graphically depicts the relative intensity of the beam spot as a function of a radial location within the beam spot, according to one or more embodiments described herein.

Referring again to FIGS. 2A and 2B, the one or more phase contour ridges 154 comprise a plurality of phase contours that are not radially symmetric. In the embodiments depicted in FIGS. 2A and 2B, the phase contour ridges 154 are spaced apart from adjacent phase contour ridges 154 by a spacing distance that is greater than the radial spacing distance between each adjacent radial phase ring 152 (i.e., the phase contour ridges 154 comprise a lower phase frequency than the radial phase rings 152), however, in other embodiments, the phase contour ridges 154 may be spaced apart from adjacent phase contour ridges 154 by a spacing distance that is less than or equal to the radial spacing distance between each adjacent radial phase ring 152. Further, the phase contour ridges 154 extend along one or more phase ridge lines 151. The phase ridge lines 151 are linear approximations of the orientation of the phase contour ridges 154, as each phase contour ridge 154 may comprise a curved shape. For example, each phase ridge line 151 is a tangent line of an individual phase contour ridge 154 that contacts the phase contour ridge 154 at a central point 155, which is the location along each individual phase contour ridge 154 that is nearest the cross-sectional center 115 of the beam spot 114 (e.g., the location of peak intensity of the beam spot 114 as depicted in FIG. 2C) and, as stated above, the beam spot 114 may be near or co-located with the cross-sectional phase contour 150. As one example, each individual phase contour ridge 154 extends approximately along an individual phase ridge line 151 and in some embodiments; the phase ridge lines 151 of the one or more phase contour ridges 154 are substantially parallel. While not intended to by limited by theory, the phase contour ridges 154 are indicative of a phase modification of phase shifted focal line 113 and have minimal to no impact on the beam intensity distribution and size of the beam spot 114.

Figure 4:
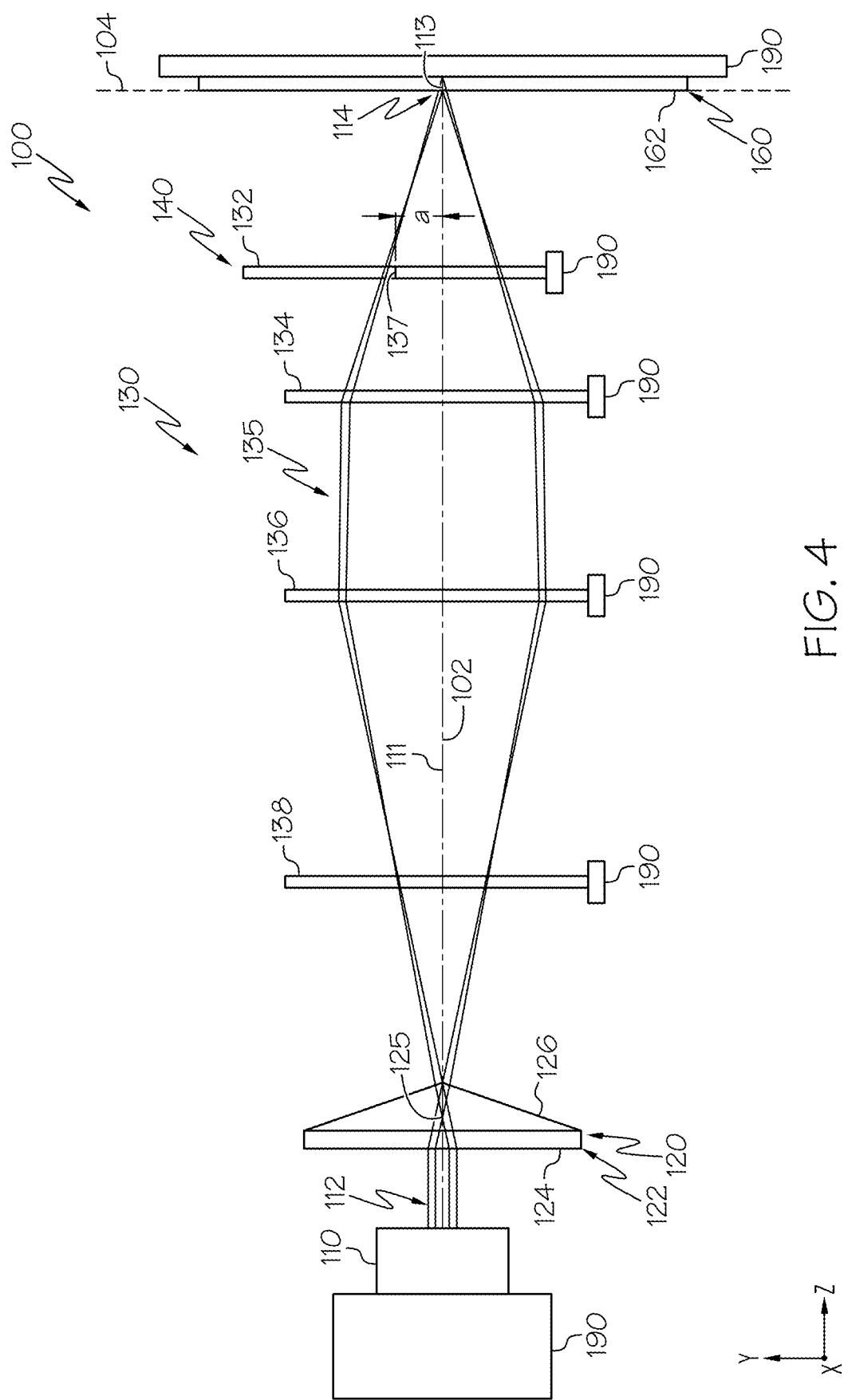
FIG. 4 schematically depicts an embodiment of an optical assembly for pulsed laser processing comprising an offset lens, according to one or more embodiments described herein.
Figure 5:
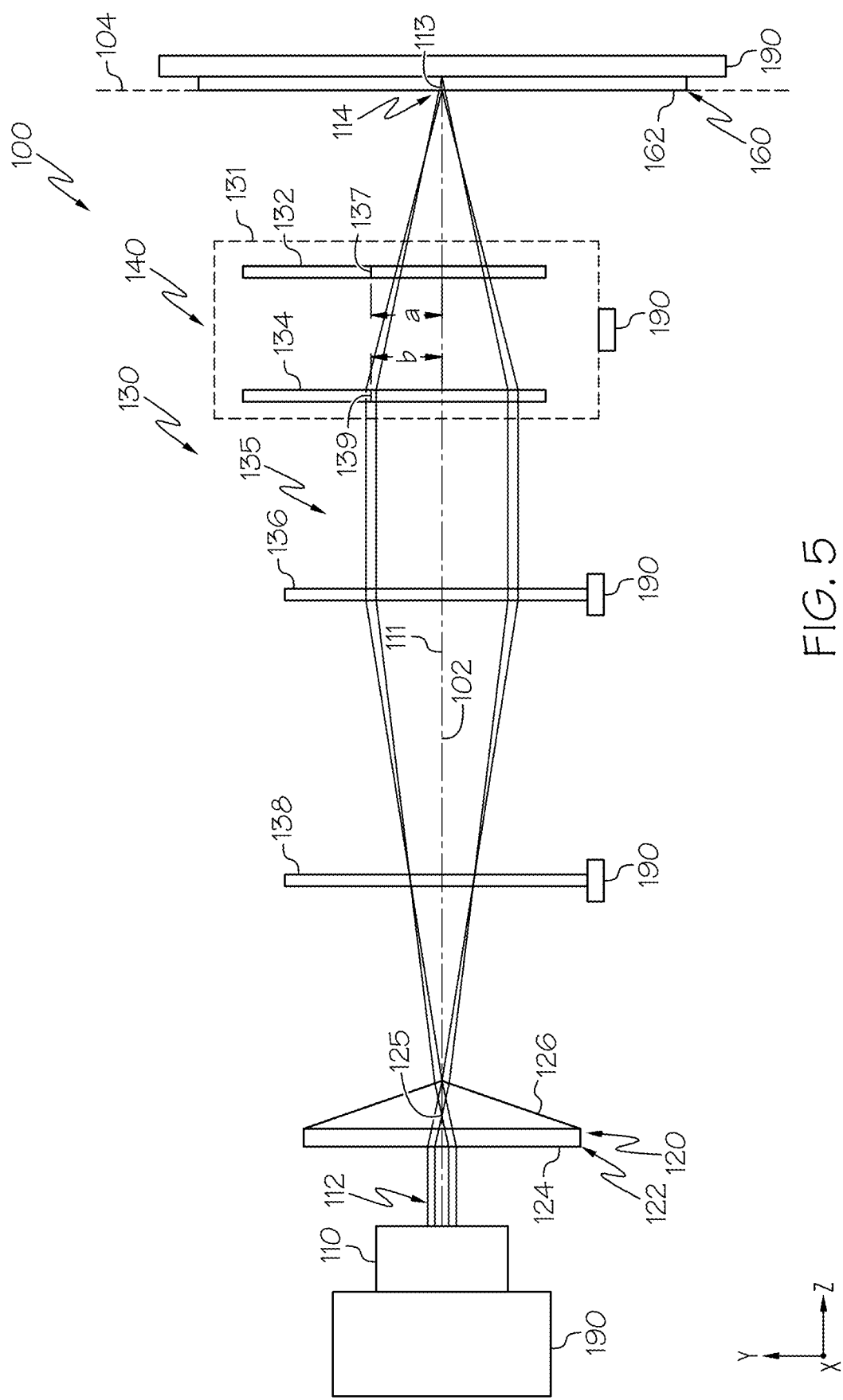
FIG. 5 schematically depicts an embodiment of an optical assembly for pulsed laser processing comprising an offset compound lens, according to one or more embodiments described herein.

Referring still to FIGS. 2A and 2B, the cross-sectional phase contour 150 indicates the relative location of the pulsed laser beam 112 and in particular, the phase shifted focal line 113 beam at a given time. While not intended to be limited by theory, by generating the cross-sectional phase contour 150 comprising the one or more phase contour ridges 154, only a portion of the material of the transparent workpiece 160 is interacting with the phase shifted focal line 113 at a specific time (e.g., irradiating the portion of the material with a sufficient non-linear intensity to induce absorption with the transparent workpiece 160 and thus create a defect 172). Further, the portions of the phase shifted focal line 113 interacting with the transparent workpiece 160 at a specific time are the phase contour ridges 154, which extend along the phase ridge lines 151. Thus, while not intending to be limited by theory, it is believed that depending on the specific time within a single $2\pi$ evolution in phase of the phase shifted focal line 113, the phase contour ridges 154 may be located in different local positions within the cross-sectional phase contour 150 while maintaining constant relative spacing between adjacent phase contour ridges 154 and maintaining an orientation along the phase ridge lines 151. While not intended to be limited by theory, it is believed that the one or more phase contour ridges 154 are induced by directing the pulsed laser beam through the phase modifying optical element 140, which in some embodiments comprises at least one of the one or more lenses 130 that is positioned offset from the beam pathway 111, as depicted in FIGS. 4 and 5.

Further, while not intending to be limited by theory, the phase shifted focal line 113 may comprise a leading portion and a trailing portion. The leading portion of the phase shifted focal line 113 is phase shifted from the trailing portion of the phase shifted focal line 113 such that the leading portion of the phase shifted focal line irradiates the imaging surface 162 of the transparent workpiece 160 before the trailing portion of the phase shifted focal line 113 irradiates the imaging surface 162 of the transparent workpiece 160. When the phase shifted focal line 113 first irradiates the imaging surface 162 of the transparent workpiece 160, the leading portion of the phase shifted focal line 113 comprises one or more of the phase contour ridges 154 of the cross-sectional phase contour 150 nearest the cross-sectional center 115 (and thereby near the peak intensity) of the beam spot 114, which is incident on the imaging surface 162, such that leading portion of the phase shifted focal line 113 is substantially oriented along or approximately the phase ridge lines 151. As a result, the material response of the transparent workpiece 160 to the phase shifted focal line 113 is not radially symmetric and instead extends substantially along the phase ridge lines 151, which in turn leads to the directional cracks, instead of random cracks.

Thus, in operation, the cross-sectional phase contour 150 may influence the cross sectional shape of the defects 172 formed by the pulsed laser beam 112 in the transparent workpiece 160. Cross-sectional shape of the defects 172 refers to shape of the defects in the direction perpendicular to the direction of propagation of the pulsed laser beam 112. If, for example, a laser beam is normally incident to the imaging surface 162 of the transparent workpiece 160, the cross-sectional shape of the defect 172 corresponds to the shape of the defects 172 in the plane of the imaging surface 162, or in any plane parallel to the plane of the imaging surface 162 of the workpiece.

Generating a cross-sectional phase contour 150 having one or more phase contour ridges 154 leads to more effective cutting, fewer defects, and higher edge strength in separated parts. Without wishing to be bound by theory, it is believed that a phase shifted focal line 113 comprising the cross-sectional phase contour 150 having one or more phase contour ridges 154 extending along the phase ridge lines 151, which are oriented along or parallel (or approximately along or parallel) the desired separation line 165 improves cutting by directing crack orientation along the trajectory of cutting. In the case of a cross-sectional phase contour 150 that does not include the one or more phase contour ridges 154, it is believed that stresses associated with the formation of damage regions are concentrated near the damage region, but with random orientations. The random stress orientations are believed to lead to fracture in directions away from the intended trajectory of cutting, manifested as micro cracks and other defects in separated parts. It is believed that such micro cracks and defects reduce the mechanical strength of the bulk and/or edges of separated parts. By employing the cross-sectional phase contour 150 having the one or more phase contour ridges 154 extending along phase ridge lines 151 oriented along or parallel (or approximately along or parallel) the desired separation line 165, it is believed that defects or cracks associated with forming damage regions can be directed along the cut with the formation of fewer cracks or defects in directions away from the desired separation line 165. Defects of cracks aligned with the desired separation line 165 are preferred to defects or cracks directed away from the desired separation line 165.

Referring again to FIGS. 1A-2B, the pulsed laser beam 112 used to form the defects 172 further has an intensity distribution I(X,Y,Z), where Z is the beam propagation direction of the pulsed laser beam 112, and X and Y are directions orthogonal to the direction of propagation, as depicted in the figures. The X-direction and Y-direction may also be referred to as cross-sectional directions and the X-Y plane may be referred to as a cross-sectional plane. The intensity distribution of the pulsed laser beam 112 in a cross-sectional plane may be referred to as a cross-sectional intensity distribution. Further, the cross-sectional phase contour 150 discussed herein is a cross sectional phase distribution in the X-Y plane.

The pulsed laser beam 112 at the beam spot 114 or other cross sections may comprise a quasi-non-diffracting beam, for example, a beam having low beam divergence as mathematically defined below, by propagating the pulsed laser beam 112 (e.g., outputting the pulsed laser beam 112, such as a Gaussian beam, using a beam source 110) through a beam converting element 120, such as an aspheric optical element 122 or an annular aperture, as described in more detail below with respect to the optical assemblies 100 depicted in FIGS. 3-5. Beam divergence refers to the rate of enlargement of the beam cross section in the direction of beam propagation (i.e., the Z direction). As used herein, the phrase "beam cross section" refers to the cross section of the pulsed laser beam 112 along a plane perpendicular to the beam propagation direction of the pulsed laser beam 112, for example, along the X-Y plane. One example beam cross section discussed herein is the beam spot 114 of the pulsed laser beam 112 projected onto the transparent workpiece 160. Example quasi non-diffracting beams include Gauss-Bessel beams and Bessel beams.

Diffraction is one factor that leads to divergence of pulsed laser beams 112. Other factors include focusing or defocusing caused by the optical systems forming the pulsed laser beams 112 or refraction and scattering at interfaces. Pulsed laser beams 112 for forming the defects 172 of the contour line 170 may have beam spots 114 with low divergence and weak diffraction. The divergence of the pulsed laser beam 112 is characterized by the Rayleigh range $Z_R$, which is related to the variance $\sigma^2$ of the intensity distribution and beam propagation factor $M^2$ of the pulsed laser beam 112. In the discussion that follows, formulas will be presented using a Cartesian coordinate system. Corresponding expressions for other coordinate systems are obtainable using mathematical techniques known to those of skill in the art. Additional information on beam divergence can be found in the articles entitled "New Developments in Laser Resonators" by A. E. Siegman in SPIE Symposium Series Vol. 1224, p. 2 (1990) and "$M^2$ factor of Bessel-Gauss beams" by R. Borghi and M. Santarsiero in Optics Letters, Vol. 22(5), 262 (1997), the disclosures of which are incorporated herein by reference in their entirety. Additional information can also be found in the international standards ISO 11146-1:2005(E) entitled "Lasers and laser-related equipment—Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

The spatial coordinates of the centroid of the intensity profile of the pulsed laser beam 112 having a time-averaged intensity profile I(x, y, z) are given by the following expressions:

$$\bar{x}(z) = \frac{\int_{-\infty}^{\infty}\int_{-\infty}^{\infty} xI(x, y, z)dxdy}{\int_{-\infty}^{\infty}\int_{-\infty}^{\infty} I(x, y, z)dxdy} \qquad (1)$$

$$\bar{y}(z) = \frac{\int_{-\infty}^{\infty}\int_{-\infty}^{\infty} yI(x, y, z)dxdy}{\int_{-\infty}^{\infty}\int_{-\infty}^{\infty} I(x, y, z)dxdy} \qquad (2)$$

These are also known as the first moments of the Wigner distribution and are described in Section 3.5 of ISO 11146-2:2005(E). Their measurement is described in Section 7 of ISO 11146-2:2005(E).

Variance is a measure of the width, in the cross-sectional (X-Y) plane, of the intensity distribution of the pulsed laser beam 112 as a function of position z in the direction of beam propagation. For an arbitrary laser beam, variance in the X-direction may differ from variance in the Y-direction. We let $\sigma_x^2(z)$ and $\sigma_y^2(z)$ represent the variances in the X-direction and Y-direction, respectively. Of particular interest are the variances in the near field and far field limits. We let $\sigma_{0x}^2(z)$ and $\sigma_{0y}^2(z)$ represent variances in the X-direction and Y-direction, respectively, in the near field limit, and we let $\sigma_{\infty x}^2(z)$ and $\sigma_{\infty y}^2(z)$ represent variances in the X-direction and Y-direction, respectively, in the far field limit. For a laser beam having a time-averaged intensity profile I(x,y,z)

with Fourier transform $\tilde{I}(v_x,v_y)$ (where $v_x$ and $v_y$ are spatial frequencies in the X-direction and Y-direction, respectively), the near field and far field variances in the x-direction and y-direction are given by the following expressions:

$$\sigma_{0x}^2(z) = \frac{\int_{-\infty}^{\infty}\int_{-\infty}^{\infty} x^2 I(x, y, z)dxdy}{\int_{-\infty}^{\infty}\int_{-\infty}^{\infty} I(x, y, z)dxdy} \quad (3)$$

$$\sigma_{0y}^2(z) = \frac{\int_{-\infty}^{\infty}\int_{-\infty}^{\infty} y^2 I(x, y, z)dxdy}{\int_{-\infty}^{\infty}\int_{-\infty}^{\infty} I(x, y, z)dxdy} \quad (4)$$

$$\sigma_{\infty x}^2(z) = \frac{\int_{-\infty}^{\infty}\int_{-\infty}^{\infty} v_x^2 \tilde{I}(v_x, v_y)dv_x dv_y}{\int_{-\infty}^{\infty}\int_{-\infty}^{\infty} \tilde{I}(v_x, v_y)dv_x dv_y} \quad (5)$$

$$\sigma_{\infty y}^2(z) = \frac{\int_{-\infty}^{\infty}\int_{-\infty}^{\infty} v_y^2 \tilde{I}(v_x, v_y)dv_x dv_y}{\int_{-\infty}^{\infty}\int_{-\infty}^{\infty} \tilde{I}(v_x, v_y)dv_x dv_y} \quad (6)$$

The variance quantities $\sigma_{0x}^2(z)$, $\sigma_{0y}^2(z)$, $\sigma_{\infty x}^2$, and $\sigma_{\infty y}^2$ are also known as the diagonal elements of the Wigner distribution (see ISO 11146-2:2005(E)). These variances can be quantified for an experimental laser beam using the measurement techniques described in Section 7 of ISO 11146-2:2005(E). In brief, the measurement uses a linear unsaturated pixelated detector to measure $I(x, y)$ over a finite spatial region that approximates the infinite integration area of the integral equations which define the variances and the centroid coordinates. The appropriate extent of the measurement area, background subtraction and the detector pixel resolution are determined by the convergence of an iterative measurement procedure described in Section 7 of ISO 11146-2:2005(E). The numerical values of the expressions given by equations 1-6 are calculated numerically from the array of intensity values as measured by the pixelated detector.

Through the Fourier transform relationship between the transverse amplitude profile $\tilde{u}(x,y,z)$ for an arbitrary optical beam (where $I(x,y,z)=|\tilde{u}(x,y,z)|^2$) and the spatial-frequency distribution $\tilde{P}(v_x,v_y,z)$ for an arbitrary optical beam (where $\tilde{I}(v_x,v_y)\equiv|\tilde{P}(v_x,v_y,z)|^2$), it can be shown that:

$$\sigma_x^2(z)=\sigma_{0x}^2(z_{0x})+\lambda^2\sigma_{\infty x}^2(z-z_{0x})^2 \quad (7)$$

$$\sigma_y^2(z)=\sigma_{0y}^2(z_{0y})+\lambda^2\sigma_{\infty y}^2(z-z_{0y}) \quad (8)$$

In equations (7) and (8), $\sigma_{0x}^2(z_{0x})$ and $\sigma_{0y}^2(z_{0y})$ are minimum values of $\sigma_{0x}^2(z)$ and $\sigma_{0y}^2(z)$, which occur at waist positions $z_{0x}$ and $z_{0y}$, in the x-direction and y-direction, respectively, and $\lambda$ is the wavelength of the beam. Equations (7) and (8) indicate that $\sigma_x^2(z)$ and $\sigma_y^2(z)$ increase quadratically with z in either direction from the minimum values associated with the waist position of the beam. Further, in the embodiments described herein comprising a beam spot 114 that is axisymmetric and thereby comprises an axisymmetric intensity distribution $I(x,y)$, $\sigma_x^2(z)=\sigma_y^2(z)$ and in the embodiments described herein comprising a beam spot 114 that is non-axisymmetric and thereby comprises a non-axisymmetric intensity distribution $I(x,y)$, $\sigma_x^2(z)\neq\sigma_y^2(z)$, i.e., $\sigma_x^2(z)<\sigma_y^2(z)$ or $\sigma_x^2(z)>\sigma_y^2(z)$.

Equations (7) and (8) can be rewritten in terms of a beam propagation factor $M^2$, where separate beam propagations factors $M_x^2$ and $M_y^2$ for the x-direction and the y-direction are defined as:

$$M_x^2=4\pi\sigma_{0x}\sigma_{\infty x} \quad (9)$$

$$M_y^2=4\pi\sigma_{0y}\sigma_{\infty y} \quad (10)$$

Rearrangement of Equations (9) and (10) and substitution into Equations (7) and (8) yields:

$$\sigma_x^2(z) = \sigma_{0x}^2(z_{0x}) + \frac{\lambda^2 M_x^4}{(4\pi\sigma_{0x})^2}(z-z_{0x})^2 \quad (11)$$

$$\sigma_y^2(z) = \sigma_{0y}^2(z_{0y}) + \frac{\lambda^2 M_y^4}{(4\pi\sigma_{0y})^2}(z-z_{0y})^2 \quad (12)$$

which can be rewritten as:

$$\sigma_x^2(z) = \sigma_{0x}^2(z_{0x})\left[1 + \frac{(z-z_{0x})^2}{Z_{Rx}^2}\right] \quad (13)$$

$$\sigma_y^2(z) = \sigma_{0y}^2(z_{0y})\left[1 + \frac{(z-z_{0y})^2}{Z_{Ry}^2}\right] \quad (14)$$

where the Rayleigh ranges $Z_{Rx}$ and $Z_{Ry}$ in the x-direction and y-direction, respectively, are given by:

$$Z_{Rx} = \frac{4\pi\sigma_{0x}^2}{M_x^2\lambda} \quad (15)$$

$$Z_{Ry} = \frac{4\pi\sigma_{0y}^2}{M_y^2\lambda} \quad (16)$$

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. Further, in the embodiments described herein comprising a beam spot 114 that is axisymmetric and thereby comprises an axisymmetric intensity distribution $I(x,y)$, $Z_{Rx}=Z_{Ry}$ and in the embodiments described herein comprising a beam spot 114 that is non-axisymmetric and thereby comprises a non-axisymmetric intensity distribution $I(x,y)$, $Z_{Rx}\neq Z_{Ry}$, i.e., $Z_{Rx}<Z_{Ry}$ or $Z_{Rx}>Z_{Ry}$. The Rayleigh range can also be observed as the distance along the beam axis at which the optical intensity decays to one half of its value observed at the beam waist location (location of maximum intensity). Laser beams with large Rayleigh ranges have low divergence and expand more slowly with distance in the beam propagation direction than laser beams with small Rayleigh ranges.

The formulas above can be applied to any laser beam (not just Gaussian beams) by using the intensity profile $I(x,y,z)$ that describes the laser beam. In the case of the $TEM_{00}$ mode of a Gaussian beam, the intensity profile is given by:

$$I(x, y) = \frac{\sqrt{\pi}}{2}w_o e^{\frac{-2(x^2+y^2)}{w_o^2}} \quad (17)$$

where $w_o$ is the radius (defined as the radius at which beam intensity decreases to $1/e^2$ of the peak beam intensity of the beam at a beam waist position $z_o$. From Equation (17) and the above formulas, we obtain the following results for a $TEM_{00}$ Gaussian beam:

$$\sigma_{0x}^2 = \sigma_{0y}^2 = \frac{w_o^2}{4} \tag{18}$$

$$\sigma_{\infty x}^2 = \sigma_{\infty y}^2 = \frac{1}{4\pi^2 w_o^2} \tag{19}$$

$$M_x^2 = 4\pi\sigma_{0x}\sigma_{\infty x} = 1 \tag{20}$$

$$M_y^2 = 4\pi\sigma_{0y}\sigma_{\infty y} = 1 \tag{21}$$

$$Z_{Rx} = \frac{4\pi\sigma_{0x}^2}{M_x^2 \lambda} = \frac{\pi w_0^2}{\lambda} \tag{22}$$

$$Z_{Ry} = \frac{4\pi\sigma_{0y}^2}{M_y^2 \lambda} = \frac{\pi w_0^2}{\lambda} \tag{23}$$

$$w^2(z) = w_0^2 + \frac{\lambda^2}{(\pi w_0)^2}(z-z_0)^2 = w_0^2\left[1 + \frac{(z-z_0)^2}{Z_R^2}\right] \tag{24}$$

where $Z_R = Z_{Rx} = Z_{Ry}$. For Gaussian beams, it is further noted that $M^2 = M_x^2 = M_y^2 = 1$.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value, denoted in Equation (17) as $w_0$. The maximum intensity of a Gaussian beam occurs at the center ($x=0$ and $y=0$ (Cartesian) or $r=0$ (cylindrical)) of the intensity distribution and radial extent used to determine spot size is measured relative to the center.

Beams with axisymmetric (i.e. rotationally symmetric around the beam propagation axis Z) cross sections can be characterized by a single dimension or spot size that is measured at the beam waist location as specified in Section 3.12 of ISO 11146-1:2005(E). For a Gaussian beam, Equation (17) shows that spot size is equal to $w_o$, which from Equation (18) corresponds to $2\sigma_{0x}$ or $2\sigma_{0y}$. For an axisymmetric beam having an axisymmetric cross section, such as a circular cross section, $\sigma_{0x} = \sigma_{0y}$. Thus, for axisymmetric beams, the cross section dimension may be characterized with a single spot size parameter, where $w_o = 2\sigma_0$. Spot size can be similarly defined for non-axisymmetric beam cross sections where, unlike an axisymmetric beam, $\sigma_{0x} \neq \sigma_{0y}$. Thus, when the spot size of the beam is non-axisymmetric, it is necessary to characterize the cross-sectional dimensions of a non-axisymmetric beam with two spot size parameters: $w_{ox}$ and $w_{oy}$ in the x-direction and y-direction, respectively, where $$w_{ox} = 2\sigma_{0x} \tag{25}$$

$$w_{oy} = 2\sigma_{0y} \tag{26}$$

Further, the lack of axial (i.e. arbitrary rotation angle) symmetry for a non-axisymmetric beam means that the results of a calculation of values of $\sigma_{0x}$ and $\sigma_{0y}$ will depend on the choice of orientation of the x-axis and y-axis. ISO 11146-1:2005(E) refers to these reference axes as the principal axes of the power density distribution (Section 3.3-3.5) and in the following discussion we will assume that the x and y axes are aligned with these principal axes. Further, an angle $\phi$ about which the x-axis and y-axis may be rotated in the cross-sectional plane (e.g., an angle of the x-axis and y-axis relative to reference positions for the x-axis and y-axis, respectively) may be used to define minimum ($w_{o,min}$) and maximum values ($w_{o,max}$) of the spot size parameters for a non-axisymmetric beam:

$$w_{o,min} = 2\sigma_{0,min} \tag{27}$$

$$w_{o,max} = 2\sigma_{0,max} \tag{28}$$

where $2\sigma_{0,min} = 2\sigma_{0x}(\phi_{min,x}) = 2\sigma_{0y}(\phi_{min,y})$ and $2\sigma_{0,max} = 2\sigma_{0x}(\phi_{max,x}) = 2\sigma_{0y}(\phi_{max,y})$ The magnitude of the axial asymmetry of the beam cross section can be quantified by the aspect ratio, where the aspect ratio is defined as the ratio of $w_{o,max}$ to $w_{o,min}$. An axisymmetric beam cross section has an aspect ratio of 1.0, while elliptical and other non-axisymmetric beam cross sections have aspect ratios greater than 1.0, for example, greater than 1.1, greater than 1.2, greater than 1.3, greater than 1.4, greater than 1.5, greater than 1.6, greater than 1.7, greater than 1.8, greater than 1.9, greater than 2.0, greater than 3.0, greater than 5.0, greater than 10.0, or the like To promote uniformity of defects 172 in the beam propagation direction (e.g. depth dimension of the transparent workpiece 160), a pulsed laser beam 112 having low divergence may be used. In one or more embodiments, pulsed laser beams 112 having low divergence may be utilized for forming defects 172. As noted above, divergence can be characterized by the Rayleigh range. For non-axisymmetric beams, Rayleigh ranges for the principal axes X and Y are defined by Equations (15) and (16) for the x-direction and y-direction, respectively, where it can be shown that for any real beam, $M_x^2 > 1$ and $M_y^2 > 1$ and where $\sigma_{0x}^2$ and $\sigma_{0y}^2$ are determined by the intensity distribution of the laser beam. For symmetric beams, Rayleigh range is the same in the X-direction and Y-direction and is expressed by Equation (22) or Equation (23). Low divergence correlates with large values of the Rayleigh range and weak diffraction of the laser beam.

Beams with Gaussian intensity profiles may be less preferred for laser processing to form defects because, when focused to small enough spot sizes (such as spot sizes in the range of microns, such as about 1-5 microns or about 1-10 microns) to enable available laser pulse energies to modify materials such as glass, they are highly diffracting and diverge significantly over short propagation distances. To achieve low divergence, it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

For non-axisymmetric beams, the Rayleigh ranges $Z_{Rx}$ and $Z_{Ry}$ are unequal. Equations (15) and (16) indicate that $Z_{Rx}$ and $Z_{Ry}$ depend on $\sigma_{0x}$ and $\sigma_{0y}$, respectively, and above we noted that the values of $\sigma_{0x}$ and $\sigma_{0y}$ depend on the orientation of the X-axis and Y-axis. The values of $Z_{Rx}$ and $Z_{Ry}$ will accordingly vary, and each will have a minimum value and a maximum value that correspond to the principal axes, with the minimum value of $Z_{Rx}$ being denoted as $Z_{Rx,min}$ and the minimum value of of $Z_{Ry}$ being denoted $Z_{Ry,min}$ for an arbitrary beam profile $Z_{Rx,min}$ and $Z_{Ry,min}$ can be shown to be given by $$Z_{Rx,min} = \frac{4\pi\sigma_{0,min}^2}{M_x^2 \lambda} \text{ and} \tag{29}$$

$$Z_{Ry,min} = \frac{4\pi\sigma_{0,min}^2}{M_y^2 \lambda} \tag{30}$$

Since divergence of the laser beam occurs over a shorter distance in the direction having the smallest Rayleigh range, the intensity distribution of the pulsed laser beam used for cutting may be controlled so that the minimum values of $Z_{Rx}$ and $Z_{Ry}$ (or for axisymmetric beams, the value of $Z_R$) are as large as possible. Since the minimum value $Z_{Rx,min}$ of $Z_{Rx}$ and the minimum value $Z_{Ry,min}$ of $Z_{Ry}$ differ for a non-axisymmetric beam, a laser beam with an intensity distribution may be used that makes the smaller of $Z_{Rx,min}$ and $Z_{Ry,min}$ as large as possible when forming damage regions.

In different embodiments, the smaller of $Z_{Rx,min}$ and $Z_{Ry,min}$ (or for axisymmetric beams, the value of $Z_R$) is greater than or equal to 50 µm, greater than or equal to 100 µm, greater than or equal to 200 µm, greater than or equal to 300 µm, greater than or equal to 500 µm, greater than or equal to 1 mm, greater than or equal to 2 mm, greater than or equal to 3 mm, greater than or equal to 5 mm, in the range from 50 µm to 10 mm, in the range from 100 µm to 5 mm, in the range from 200 µm to 4 mm, in the range from 300 µm to 2 mm, or the like.

The values and ranges for the smaller of $Z_{Rx,min}$ and $Z_{Ry,min}$ (or for axisymmetric beams, the value of $Z_R$) specified herein are achievable for different wavelengths to which the workpiece is transparent through adjustment of the spot size parameter $w_{o,min}$ defined in Equation (27). In different embodiments, the spot size parameter $w_{o,min}$ is greater than or equal to 0.25 µm, greater than or equal to 0.50 µm, greater than or equal to 0.75 µm, greater than or equal to 1.0 µm, greater than or equal to 2.0 µm, greater than or equal to 3.0 µm, greater than or equal to 5.0 µm, in the range from 0.25 µm to 10 µm, in the range from 0.25 µm to 5.0 µm, in the range from 0.25 µm to 2.5 µm, in the range from 0.50 µm to 10 µm, in the range from 0.50 µm to 5.0 µm, in the range from 0.50 µm to 2.5 µm, in the range from 0.75 µm to 10 µm, in the range from 0.75 µm to 5.0 µm, in the range from 0.75 µm to 2.5 µm, or the like.

Non-diffracting or quasi non-diffracting beams generally have complicated intensity profiles, such as those that decrease non-monotonically vs. radius. By analogy to a Gaussian beam, an effective spot size $w_{o,eff}$ can be defined for non-axisymmetric beams as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range based on the effective spot size $w_{o,eff}$ for non-axisymmetric beams or the spot size $w_o$ for axisymmetric beams can be specified as non-diffracting or quasi non-diffracting beams for forming damage regions using equation (31) for non-axisymmetric beams of equation (32) for axisymmetric beams, below:

$$\text{Smaller of } Z_{Rx,min}, Z_{Ry,min} > F_D \frac{\pi w_{0,eff}^2}{\lambda} \quad (31)$$

$$Z_R > F_D \frac{\pi w_0^2}{\lambda} \quad (32)$$

where $F_D$ is a dimensionless divergence factor having a value of at least 10, at least 50, at least 100, at least 250, at least 500, at least 1000, in the range from 10 to 2000, in the range from 50 to 1500, in the range from 100 to 1000. By comparing Equation (31) to Equation (22) or (23), one can see that for a non-diffracting or quasi non-diffracting beam the distance, Smaller of $Z_{Rx,min}$, $Z_{Ry,min}$ in Equation (31), over which the effective beam size doubles, is $F_D$ times the distance expected if a typical Gaussian beam profile were used. The dimensionless divergence factor $F_D$ provides a criterion for determining whether or not a laser beam is quasi-non-diffracting. As used herein, a laser beam is considered quasi-non-diffracting if the characteristics of the laser beam satisfy Equation (31) or Equation (32) with a value of $F_D \geq 10$. As the value of $F_D$ increases, the laser beam approaches a more nearly perfectly non-diffracting state. Moreover, it should be understood that Equation (32) is merely a simplification of Equation (31) and as such, Equation (31) mathematically describes the dimensionless divergence factor $F_D$ for both axisymmetric and non-axisymmetric beams.

Figure 3:
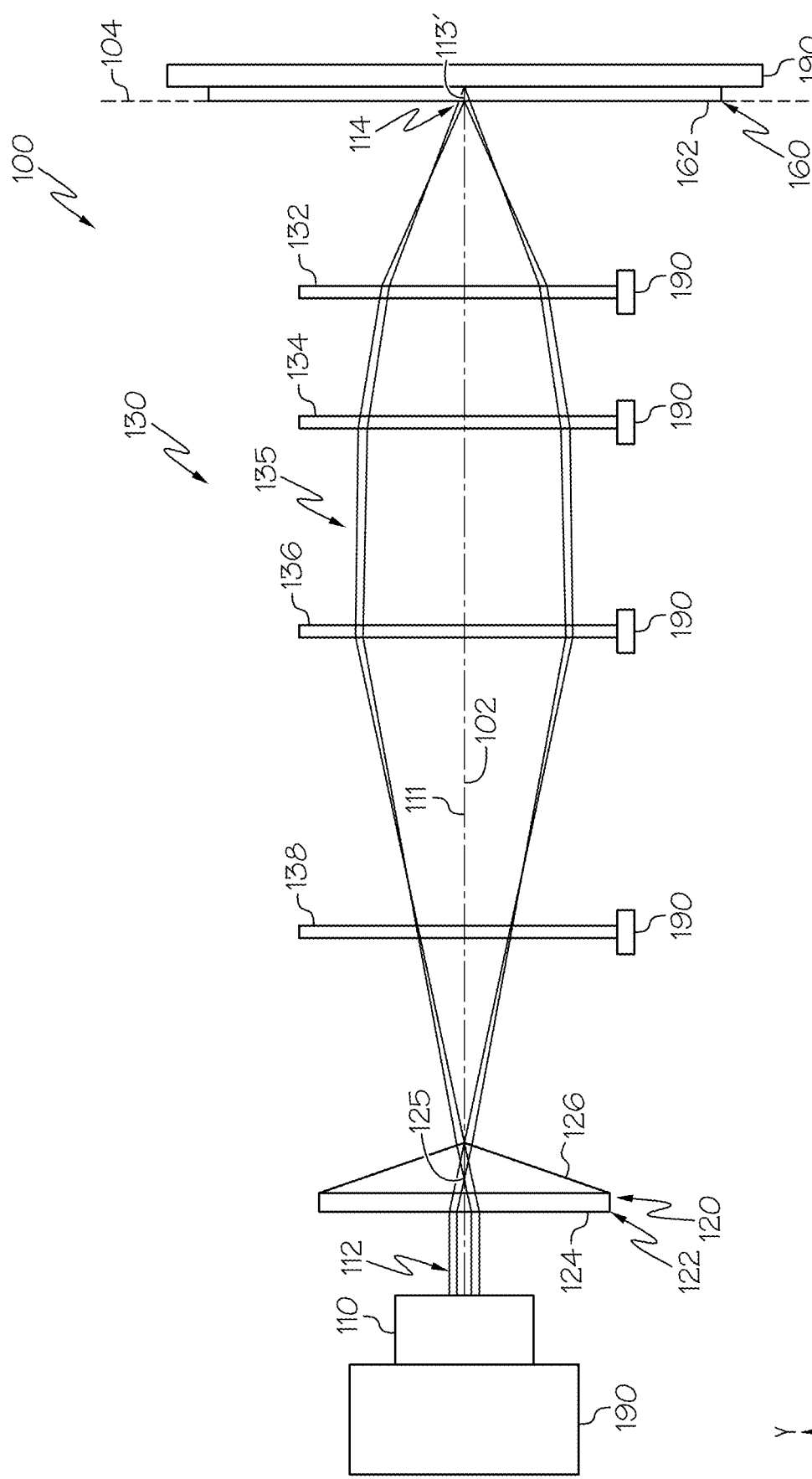
FIG. 3 schematically depicts a conventional embodiment of an optical assembly for pulsed laser processing, according to one or more embodiments described herein.

Referring now to FIGS. 3-5, optical assemblies 100 for producing a pulsed laser beam 112 that is quasi non-diffracting (FIGS. 3-5) and, in some embodiments, produces the phase shifted focal line 113 at the transparent workpiece 160 (FIGS. 4 and 5) is schematically depicted. For example, FIG. 3 depicts a conventional optical assembly 100 for pulsed laser processing, for example, for producing a pulsed laser beam 112 that is quasi-non-diffracting and forms a non-phase shifted focal line 113'. Further, FIGS. 4 and 5 each depict optical assemblies 100 for producing a pulsed laser beam 112 that is quasi-non-diffracting and forms the phase shifted focal line 113 at the transparent workpiece 160 using the phase modifying optical element 140. In some embodiments, the phase modifying optical element 140 comprises a waveplate, an optical wedge, or one or more lenses 130, at least one of which is positioned offset relative to the beam pathway 111.

The one or more lenses 130 may include one or more focusing lenses, such as a first focusing lens 132 and a second focusing lens 134. The one or more lenses 130 may also include a collimating lens 136 and an expanding lens 138. In the optical assembly 100 of FIG. 4, the first focusing lens 132 is positioned offset relative the beam pathway 111. Further, in the optical assembly 100 of FIG. 5, the first focusing lens 132 and the second focusing lens 134 comprise a compound lens 131, which is positioned offset relative to the beam pathway 111. While FIG. 4 depicts the first focusing lens 132 positioned offset relative the beam pathway 111, and FIG. 5 depicts both the first focusing lens 132 and the second focusing lens 134 positioned offset relative the beam pathway 111 it should be understood that the cross-sectional phase contour 150 of the phase shifted focal line 113 may be induced by offsetting any of the one or more lenses 130. Moreover, at least one of the one or more lenses 130 may be positioned offset from the beam pathway 111 using one or more translation stages 190 which may be coupled to the one or more lenses 130.

The optical assembly 100 depicted in each of FIGS. 3-5 also comprise a beam source 110, a beam converting element 120 (e.g., an aspheric optical element 122 such an axicon lens or an annular aperture), and one or more lenses 130. Further, the transparent workpiece 160 may be positioned such that the pulsed laser beam 112 output by the beam source 110 irradiates the transparent workpiece 160, for example, after traversing the beam converting element 120 and thereafter, the one or more lenses 130. An optical axis 102 extends between the beam source 110 and the transparent workpiece 160 along the Z-axis such that when the beam source 110 outputs the pulsed laser beam 112, the beam pathway 111 of the pulsed laser beam 112 extends along the optical axis 102. As used herein "upstream" and "downstream" refer to the relative position of two locations or components along the beam pathway 111 with respect to the beam source 110. For example, a first component is upstream from a second component if the pulsed laser beam 112 traverses the first component before traversing the second component. Further, a first component is downstream from a second component if the pulsed laser beam 112 traverses the second component before traversing the first component.

Referring still to FIGS. 3-5, the beam source 110 may comprise any known or yet to be developed beam source 110 configured to output pulsed laser beams 112. In operation, the defects 172 of the contour line 170 are produced by interaction of the transparent workpiece 160 with the pulsed laser beam 112 output by the beam source 110. In some embodiments, the beam source 110 may output a pulsed laser beam 112 comprising a wavelength of for example, 1064 nm, 1030 nm, 532 nm, 530 nm, 355 nm, 343 nm, or 266 nm, or 215 nm. Further, the pulsed laser beam 112 used to form defects 172 in the transparent workpiece 160 may be well suited for materials that are transparent to the selected pulsed laser wavelength.

Suitable laser wavelengths for forming defects 172 are wavelengths at which the combined losses of linear absorption and scattering by the transparent workpiece 160 are sufficiently low. In embodiments, the combined losses due to linear absorption and scattering by the transparent workpiece 160 at the wavelength are less than 20%/mm, or less than 15%/mm, or less than 10%/mm, or less than 5%/mm, or less than 1%/mm, where the dimension "/mm" means per millimeter of distance within the transparent workpiece 160 in the beam propagation direction of the pulsed laser beam 112 (e.g., the Z direction). Representative wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined linear absorption and scattering loss requirement for a given substrate material can also be used.

In operation, the pulsed laser beam 112 output by the beam source 110 may create multi-photon absorption (MPA) in the transparent workpiece 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

The perforation step that creates the contour line 170 may utilize the beam source 110 (e.g., an ultra-short pulse laser) in combination with the optics depicted and described below with respect to FIGS. 3-5, to project the beam spot 114 on the transparent workpiece 160 and generate the phase shifted focal line 113 of FIG. 1B. The phase shifted focal line 113 comprises the cross-sectional phase contour 150 of FIGS. 2A and 2B having the one or more phase contour ridges 154 and comprises a quasi non-diffracting beam, such as a Gauss-Bessel beam or Bessel beam, as defined above, to fully perforate the transparent workpiece 160 to form the series of defects 172 in the transparent workpiece 160. In some embodiments, the pulse duration of the individual pulses is in a range of from about 1 femtosecond to about 200 picoseconds, such as from about 1 picosecond to about 100 picoseconds, 5 picoseconds to about 20 picoseconds, or the like, and the repetition rate of the individual pulses may be in a range from about 1 kHz to 4 MHz, such as in a range from about 10 kHz to about 3 MHz, or from about 10 kHz to about 650 kHz.

Referring also to FIGS. 6A and 6B, in addition to a single pulse operation at the aforementioned individual pulse repetition rates, the pulses may be produced in pulse bursts 500 of two pulses 500A (e.g., sub-pulses) or more (such as, for example, 3 pulses, 4 pulses, 5 pulses, 10 pulses, 15 pulses, 20 pulses, or more per pulse burst, such as from 1 to 30 pulses per pulse burst 500, or from 5 to 20 pulses per pulse burst 500). The pulses 500A within the pulse burst 500 may be separated by a duration that is in a range from about 1 nsec to about 50 nsec, for example, from about 10 nsec to about 30 nsec, such as about 20 nsec. In other embodiments, the pulses 500A within the pulse burst 500 may be separated by a duration of up to 100 psec (for example, 0.1 psec, 5 psec, 10 psec, 15 psec, 18 psec, 20 psec, 22 psec, 25 psec, 30 psec, 50 psec, 75 psec, or any range therebetween). For a given laser, the time separation $T_p$ (FIG. 6B) between adjacent pulses 500A within a pulse burst 500 may be relatively uniform (e.g., within about 10% of one another). For example, in some embodiments, each pulse 500A within a pulse burst 500 is separated in time from the subsequent pulse by approximately 20 nsec (50 MHz). For example, the time between each pulse burst 500 may be from about 0.25 microseconds to about 1000 microseconds, e.g., from about 1 microsecond to about 10 microseconds, or from about 3 microseconds to about 8 microseconds.

In some of the exemplary embodiments of the beam source 110 described herein, the time separation $T_b$ (FIG. 6B) is about 5 microseconds for the beam source 110 outputting a pulsed laser beam 112 comprising a burst repetition rate of about 200 kHz. The laser burst repetition rate is related to the time $T_b$ between the first pulse in a burst to the first pulse in the subsequent burst (laser burst repetition rate=$1/T_b$). In some embodiments, the laser burst repetition rate may be in a range of from about 1 kHz to about 4 MHz. In embodiments, the laser burst repetition rates may be, for example, in a range of from about 10 kHz to 650 kHz. The time $T_b$ between the first pulse in each burst to the first pulse in the subsequent burst may be from about 0.25 microsecond (4 MHz burst repetition rate) to about 1000 microseconds (1 kHz burst repetition rate), for example from about 0.5 microseconds (2 MHz burst repetition rate) to about 40 microseconds (25 kHz burst repetition rate), or from about 2 microseconds (500 kHz burst repetition rate) to about 20 microseconds (50 k Hz burst repetition rate). The exact timing, pulse duration, and burst repetition rate may vary depending on the laser design, but short pulses ($T_d$<20 psec and, in some embodiments, $T_d$≤15 psec) of high intensity have been shown to work particularly well.

The burst repetition rate may be in a range of from about 1 kHz to about 2 MHz, such as from about 1 kHz to about 200 kHz. Bursting or producing pulse bursts 500 is a type of laser operation where the emission of pulses 500A is not in a uniform and steady stream but rather in tight clusters of pulse bursts 500. The pulse burst laser beam may have a wavelength selected based on the material of the transparent workpiece 160 being operated on such that the material of the transparent workpiece 160 is substantially transparent at the wavelength. The average laser power per burst measured at the material may be at least about 40 µJ per mm of thickness of material. For example, in embodiments, the average laser power per burst may be from about 40 µJ/mm to about 2500 µJ/mm, or from about 500 µJ/mm to about 2250 µJ/mm. In a specific example, for 0.5 mm to 0.7 mm thick Corning EAGLE XG® transparent workpiece, pulse bursts of from about 300 µJ to about 600 µJ may cut and/or separate the workpiece, which corresponds to an exemplary range of about 428 µJ/mm to about 1200 µJ/mm (i.e., 300 µJ/0.7 mm for 0.7 mm EAGLE XG® glass and 600 µJ/0.5 mm for a 0.5 mm EAGLE XG® glass).

The energy required to modify the transparent workpiece 160 may be described in terms of the burst energy (i.e., the energy contained within a pulse burst 500 where each pulse burst 500 contains a series of pulses 500A), or in terms of the energy contained within a single laser pulse (many of which may comprise a burst). The energy per pulse burst may be from about 25 µJ to about 750 µJ, e.g., from about 50 µJ to about 500 µJ, or from about 50 µJ to about 250 µJ. For some glass compositions, the energy per pulse burst may be from about 100 µJ to about 250 µJ. However, for display or TFT glass compositions, the energy per pulse burst may be higher (e.g., from about 300 µJ to about 500 µJ, or from about 400 µJ to about 600 µJ, depending on the specific glass composition of the transparent workpiece 160). The use of a pulsed laser beam 112 capable of generating such bursts is advantageous for cutting or modifying transparent materials, for example glass. In contrast with the use of single pulses spaced apart in time by the repetition rate of the single-pulsed laser, the use of a burst sequence that spreads the laser energy over a rapid sequence of pulses within the burst allows access to larger timescales of high intensity interaction with the material than is possible with single-pulse lasers.

Referring again to FIGS. 3-5, the beam converting element 120 may comprise an aspheric optical element 122 positioned within the beam pathway 111 between the beam source 110 and the transparent workpiece 160. In operation, propagating the pulsed laser beam 112, e.g., an incoming Gaussian beam, through the aspheric optical element 122 may alter the pulsed laser beam 112 such that the portion of the pulsed laser beam 112 propagating beyond the aspheric optical element 122 is quasi-non-diffracting, as described above. The aspheric optical element 122 may comprise any optical element comprising an aspherical shape. In some embodiments, the aspheric optical element 122 may comprise a conical wavefront producing optical element, such as an axicon lens, for example, a negative refractive axicon lens, a positive refractive axicon lens, a reflective axicon lens, a diffractive axicon lens, a programmable spatial light modulator axicon lens (e.g., a phase axicon), or the like.

In some embodiments, the aspheric optical element 122 comprises at least one aspheric surface whose shape is mathematically described as:

$$z' = \left(\frac{cr^2}{1}\right) + (1 - (1+k)(c^2 r^2))^{1/2} + (a_1 r + a_2 r^2 + a_3 r^3 + a_4 r^4 + a_5 r^5 + a_6 r^6 + a_7 r^7 + a_8 r^8 + a_9 r^9 + a_{10} r^{10} + a_{11} r^{11} + a_{12} r^{12}$$

where z' is the surface sag of the aspheric surface, r is the distance between the aspheric surface and the optical axis 102 in a radial direction (e.g., in an x-direction or a y-direction), c is the surface curvature of the aspheric surface (i.e. $c_i = 1/R_i$, where R is the surface radius of the aspheric surface), k is the conic constant, and coefficients $a_i$ are the first through the twelfth order aspheric coefficients or higher order aspheric coefficients (polynomial aspheres) describing the aspheric surface. In one example embodiment, at least one aspheric surface of the aspheric optical element 122 includes the following coefficients $a_1$-$a_7$, respectively: −0.085274788; 0.065748845; 0.077574995; −0.054148636; 0.022077021; −0.0054987472; 0.0006682955; and the aspheric coefficients $a_8$-$a_{12}$ are 0. In this embodiment, the at least one aspheric surface has the conic constant k=0. However, because the $a_1$ coefficient has a nonzero value, this is equivalent to having a conic constant k with a non-zero value. Accordingly, an equivalent surface may be described by specifying a conic constant k that is non zero, a coefficient $a_1$ that is non-zero, or a combination of a nonzero k and a non-zero coefficient $a_1$. Further, in some embodiments, the at least one aspheric surface is described or defined by at least one higher order aspheric coefficients $a_2$-$a_{12}$ with non-zero value (i.e., at least one of $a_2$, $a_3$, $a_{12} \neq 0$). In one example embodiment, the aspheric optical element 122 comprises a third-order aspheric optical element such as a cubically shaped optical element, which comprises a coefficient $a_3$ that is non-zero.

In some embodiments, when the aspheric optical element 122 comprises an axicon, the axicon may have a laser output surface 126 (e.g., conical surface) having an angle of about 1.2°, such as from about 0.5° to about 5°, or from about 1° to about 1.5°, or even from about 0.5° to about 20°, the angle measured relative to the laser input surface 124 (e.g., flat surface) upon which the pulsed laser beam 112 enters the axicon lens. Further, the laser output surface 126 terminates at a conical tip. Moreover, the aspheric optical element 122 includes a centerline axis 125 extending from the laser input surface 124 to the laser output surface 126 and terminating at the conical tip. In other embodiments, the aspheric optical element 122 may comprise, a spatial phase modulator such as a spatial light modulator, or a diffractive optical grating. In operation, the aspheric optical element 122 shapes the incoming pulsed laser beam 112 (e.g., an incoming Gaussian beam) into a quasi-non-diffracting beam, which, in turn, is directed through the one or more lenses 130. Further, in some embodiments, the beam converting element 120 may be an annular aperture.

Referring still to FIGS. 3-5, the one or more lenses 130 may comprise the first focusing lens 132, the second focusing lens 134, the collimating lens 136 and the expanding lens 138. In some embodiments, the first focusing lens 132 and the second focusing lens 134 are arranged as a compound lens 131. As depicted in FIGS. 3-5, the expanding lens 138 and the collimating lens 136 are each positioned along the beam pathway 111 between the beam source 110 and both the first and second focusing lenses 132, 134. In particular, the expanding lens 138 may be positioned between the beam source 110 and the collimating lens 136 and the collimating lens 136 may be positioned between the expanding lens 138 and the first focusing lens 132 and the second focusing lens 134. In operation, the expanding lens 138 may expand the pulsed laser beam 112 along the portion of the beam pathway 111 between the expanding lens 138 and the collimating lens 136 and the collimating lens may collimate the pulsed laser beam 112 within a collimation space 135 located along the portion of the beam pathway 111 between the collimating lens 136 and the most upstream positioned of the first focusing lens 132 and the second focusing lens 134 (i.e. the second focusing lens 134 in the embodiments depicted in FIGS. 3-5). Further, the first focusing lens 132 and the second focusing lens 134 may focus the pulsed laser beam 112 into the transparent workpiece 160, which may be positioned at an imaging plane 104. Example lenses 130 include plano-convex lenses, a meniscus lenses, aspheric lenses, or higher-order corrected focusing lenses, or the like.

Referring now to FIG. 4, an embodiment of the optical assembly 100 is depicted in which the phase modifying optical element 140 comprises the first focusing lens 132 positioned offset relative to the beam pathway 111 of the pulsed laser beam 112 in a radial offset direction (e.g., a direction along a radius of the pulsed laser beam 112, orthogonal to the beam propagation direction). As depicted in FIG. 4, the first focusing lens 132 may be positioned offset from the beam pathway 111 (e.g., offset in the X-Y plane) by an offset distance a. In particular, the offset distance a is the distance in the X-Y plane between a centerline axis 137 of the first focusing lens 132 and the cross-sectional center of the pulsed laser beam 112 as the pulsed laser beam 112 irradiates a surface of the first focusing lens 132.

The relative offset between the first focusing lens 132 and the beam pathway 111 may be achieved by shifting the first focusing lens 132 along the X-Y plane, shifting the beam source 110 along the X-Y plane, or both. The magnitude of the offset required to sufficiently break the symmetry of the resulting cross-sectional phase contour 150 is a function of the optical layout of the optical assembly 100 and the focal length of the offset lens (e.g., the first focusing lens 132). While not intending to be limited by theory, it is believed that as the pulsed laser beam 112 propagates through the offset lens (e.g., the first focusing lens 132), different cross sectional portions of the pulsed laser beam 112 along the X-Y plane accumulate different additional phase to generate the one or more phase contour ridges 154. As an example, in an embodiment in which the offset lens (e.g., the first focusing lens 132) comprises a focal length of from about 30 microns to about 40 microns, the offset distance a may be from about 50 microns to about 500 microns. Further, other some embodiments, the offset distance a may comprise from about 10 microns to about 1 mm, for example, 20 microns, 50 microns, 100 microns, 250 microns, 500 microns or the like. In some embodiments, the offset distance a may be from about 20 microns to about 100 microns, or from about 50 microns to about 100 microns, or the like. In some embodiments, the offset distance a may comprise a distance from about 10 times to about 500 times a cross sectional diameter of the pulsed laser beam 112 at a contact location between the pulsed laser beam 112 and the first focusing lens 132. In some embodiments, the offset distance a may be a function of the wavelength of the pulsed laser beam 112, for example, the offset distance 1 may be from about 50 to 500 times the wavelength of the pulsed laser beam 112, for example 75 times, 100 time, 150 times, 200 times, 250 times, 300 times, 350 times, 400 times, 450 times, or the like.

By offsetting the first focusing lens 132 relative to the beam pathway 111, the resultant cross-sectional phase contour 150 of the phase shifted focal line 113 comprises the one or more phase contour ridges 154 extending along or approximately parallel to the phase ridge lines 151 (FIGS. 2A and 2B). Further, the orientation of the phase ridge lines 151 may be controlled by the radially offset direction of the offset lens along the X-Y plane. In particular, the phase ridge lines 151 may extend transverse the radial offset direction of the offset lens. For example, in an embodiment in which the offset lens, such as the first focusing lens 132, is offset in a radially offset direction along the X-axis, the phase ridge lines 151 may extend substantially along the Y-axis. Further, in an embodiment in which the offset lens, such as the first focusing lens 132, is offset in a radially offset direction along the Y-axis, the phase ridge lines 151 may extend substantially along the X-axis.

Further, the cross section of the pulsed laser beam 112 may be rotated by translating the first focusing lens 132 (e.g., the offset lens) relative to the pulsed laser beam 112 about the beam pathway 111, for example, by translating the first focusing lens 132, translating the pulsed laser beam 112, or both. Further, in some embodiments, when translating the first focusing lens 132 relative to the pulsed laser beam 112 about the beam pathway 111, the offset distance a between the first focusing lens 132 and the beam pathway 111 may remain constant. In operation, translating the first focusing lens 132 relative to the pulsed laser beam 112 about the beam pathway 111 may change (e.g., rotate) the radially offset direction of the first focusing lens 132 (e.g., the offset lens), thereby changing (e.g., rotating) the phase ridge lines 151 of the phase contour ridges 154. Further, rotating the phase ridge lines 151 of the one or more phase contour ridges 154 may alter the direction of the radial arms 176 of a defect 172 formed in the transparent workpiece 160 such that the contour line 170 formed in the transparent workpiece 160 may comprise a curvature along the imaging surface 162 of the transparent workpiece 160.

Further, in one embodiment, the phase modifying optical element 140, for example, the first focusing lens 132 positioned offset relative to the beam pathway 111, does not alter the intensity profile of the resultant pulsed laser beam 112 and the resultant phase shifted focal line 113. As one example, in embodiments in which the pulsed laser beam 112 comprises an axisymmetric intensity profile (e.g., a circular intensity profile) before traversing the first focusing lens 132 (e.g., the offset lens), the pulsed laser beam 112 will maintain this axisymmetric intensity profile after traversing the first focusing lens 132 (e.g., the offset lens). As another example, in embodiments in which the pulsed laser beam 112 comprises a non-axisymmetric intensity profile (e.g., an elliptical intensity profile) before traversing the first focusing lens 132 (e.g., the offset lens), the pulsed laser beam 112 will maintain this non-axisymmetric intensity profile after traversing the first focusing lens 132 (e.g., the offset lens).

Referring now to FIG. 5, an embodiment of the optical assembly 100 is depicted in which the phase modifying optical element 140 comprises the first focusing lens 132 and the second focusing lens 134 arranged as the compound lens 131 and each positioned offset relative to the beam pathway 111 of the pulsed laser beam 112 in the radial offset direction. For example, both the first and second focusing lenses 132, 134 may be radially offset in the same direction or alternatively, in different directions. [In operation, the first and second focusing lenses 132, 134 may be offset by motion of the one or more translation stages 190.

As depicted in FIG. 5, the first focusing lens 132 may be positioned offset from the beam pathway 111 (e.g., offset in the X-Y plane) by the offset distance a, which is the distance in the X-Y plane between the centerline axis 137 of the first focusing lens 132 and the cross-sectional center of the pulsed laser beam 112 as the pulsed laser beam 112 irradiates a surface of the first focusing lens 132. Further, the second focusing lens 134 may be positioned offset from the beam pathway 111 (e.g., offset in the X-Y plane) by an offset distance b, which is the distance in the X-Y plane between a centerline axis 139 of the second focusing lens 134 and the cross-sectional center of the pulsed laser beam 112 as the pulsed laser beam 112 irradiates a surface of the second focusing lens 134. In some embodiments, the offset distance a is to equal the offset distance b. In other embodiments, the offset distance a is not to equal the offset distance b, for example, the offset distance a may greater than the offset distance b or less than the offset distance b. Further, the offset distance a and the offset distance b may be any of the offset distanced described above with respect to FIG. 4, for example, from about 10 microns to about 1 mm, for example, 20 microns, 50 microns, 100 microns, 250 microns, 500 microns or the like.

Referring still to FIG. 5, by offsetting the first and second focusing lenses 132, 134 relative to the beam pathway 111, the resultant cross-sectional phase contour 150 of the phase shifted focal line 113 comprises the one or more phase contour ridges 154 extending along or approximately parallel to the phase ridge lines 151 (FIGS. 2A and 2B). Further, the orientation of the phase ridge lines 151 may be controlled by the radially offset direction of the offset lenses along the X-Y plane. In particular, the phase ridge lines 151 may extend transverse the radial offset direction of the first and the second focusing lenses 132, 134 (e.g., the offset lenses). Further, the cross section of the pulsed laser beam 112 may be rotated by translating the first and the second focusing lenses 132, 134 (e.g., the offset lenses) relative to the pulsed laser beam 112 about the beam pathway 111, for example, by translating the first and second focusing lenses 132, 134, translating the pulsed laser beam 112, or both, as described above with respect to FIG. 4. Further, offsetting the first and second focusing lenses 132, 134 relative to the beam pathway 111 does not alter the intensity profile of the resultant pulsed laser beam 112 and the resultant phase shifted focal line 113, as described above with respect to FIG. 4. While not intending to be limited by theory, it is believed that the offset distances of multiple offset lenses relative to the beam pathway 111 may be less than the offset distance of a single offset lens to induce a similar phase modification, e.g., multiple offset lenses may have a cumulative phase modification effect on the resultant phase shifted focal line 113.

Referring again to FIGS. 1A-5, a method for forming the contour line 170 comprising defects 172 along the desired separation line 165 includes directing (e.g., localizing) a pulsed laser beam 112 oriented along the beam pathway 111 and output by the beam source 110 into the transparent workpiece 160 such that the portion of the pulsed laser beam 112 directed into the transparent workpiece 160 generates an induced absorption within the transparent workpiece and the induced absorption produces a defect 172 within the transparent workpiece 160. For example, the pulsed laser beam 112 may comprise a pulse energy and a pulse duration sufficient to exceed a damage threshold of the transparent workpiece 160. In some embodiments, directing the pulsed laser beam 112 into the transparent workpiece 160 comprises focusing the pulsed laser beam 112 output by the beam source 110 into a phase shifted focal line 113 oriented along the beam propagation direction (e.g., the Z axis). The transparent workpiece 160 is positioned in the beam pathway 111 to at least partially overlap the phase shifted focal line 113 of pulsed laser beam 112. The phase shifted focal line 113 is thus directed into the transparent workpiece 160. The pulsed laser beam 112, e.g., the phase shifted focal line 113 generates induced absorption within the transparent workpiece 160 to create the defect 172 in the transparent workpiece 160. In some embodiments, individual defects 172 may be created at rates of several hundred kilohertz (i.e., several hundred thousand defects per second).

In some embodiments, the phase modifying optical element 140, for example, the one or more lenses 130 (e.g., the first focusing lens 132 and/or the second focusing lens 134) may focus the pulsed laser beam 112 into the phase shifted focal line 113. Moreover, the phase modifying optical element 140, for example, at least one of the one or more lenses 130 positioned offset along the beam pathway 111 (e.g., the first focusing lens 132 in the example depicted in FIG. 4 and both the first and second focusing lenses 132, 134 in the example depicted in FIG. 5), may also induce a phase modification within the phase shifted focal line 113 to form the cross-sectional phase contour 150 having the one or more phase contour ridges 154 extending along the phase ridge lines 151. Further, the orientation of the phase ridge lines 151 may be controlled by the radially offset direction of the offset lens. In particular, the phase ridge lines 151 may be transverse the radial offset direction of the offset lens.

In operation, the position of phase shifted focal line 113 may be controlled by suitably positioning and/or aligning the pulsed laser beam 112 relative to the transparent workpiece 160 as well as by suitably selecting the parameters of the optical assembly 100. For example, the position of the phase shifted focal line 113 may be controlled along the Z-axis and about the Z-axis. Further, the phase shifted focal line 113 may have a length in a range of from about 0.1 mm to about 100 mm or in a range of from about 0.1 mm to about 10 mm. Various embodiments may be configured to have a phase shifted focal line 113 with a length 1 of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm. In some embodiments, the phase shifted focal line may comprise a diameter (e.g., twice a radius at which beam intensity decreases to $1/e^2$) of from about 0.1 µm to about 250 µm, for example about 0.5 µm to about 0.25 µm, 1 µm to about 10 µm, or the like, such as about 0.1 µm, 0.5 µm, 1 µm, 2 µm, 3 µm, 4 µm, 5 µm, 6 µm, 7 µm, 8 µm, 9 µm, 10 µm, 20 µm, 25 µm, 50 µm, 100 µm, 200 µm, or the like. Moreover, the phase shifted focal line 113 may comprise a length to diameter aspect ratio of from about 1 to about 10,000 for example, about 2, 5, 10, 15, 20, 25, 50, 75, 100, 150, 200, 300, 500, 750, 1000, 5000, or the like.

Referring still to FIGS. 1A-5, the method for forming the contour line 170 comprising defects 172 along the desired separation line 165 may include translating the transparent workpiece 160 relative to the pulsed laser beam 112 (or the pulsed laser beam 112 may be translated relative to the transparent workpiece 160, for example, in a translation direction 101 depicted in FIGS. 1A and 2) to form contour lines 170 that trace out the shape of a desired part with defects 172. The defects 172 that may penetrate the full depth of the glass. It should be understood that while sometimes described as "holes" or "hole-like," the defects 172 disclosed herein may generally not be void spaces, but are rather portions of the transparent workpiece 160 which has been modified by laser processing as described herein. In some embodiments, the defects 172 may generally be spaced apart from one another by a distance of from about 0.1 microns to about 500 microns, for example, about 1 micron to about 200 microns, about 2 microns to about 100 microns, about 5 microns to about 20 microns, or the like. For example, suitable spacing between the defects 172 may be from about 0.1 microns to about 30 microns, such as from about 5 microns to about 15 microns, from about 5 microns to about 12 microns, from about 7 microns to about 15 microns, or from about 7 microns to about 12 microns for the TFT/display glass compositions. Further, the translation of the transparent workpiece 160 relative to the pulsed laser beam 112 may be performed by moving the transparent workpiece 160 and/or the beam source 110 using one or more translation stages 190.

Beyond the perforation of a single transparent workpiece 160, the process may also be used to perforate stacks of transparent workpieces 160, such as stacks of sheets of glass, and may fully perforate glass stacks of up to a few mm total height with a single laser pass. A single glass stack can comprise of various glass types within the stack, for example one or more layers of soda-lime glass layered with one or more layers of Corning code 2318 glass. The glass stacks additionally may have air gaps in various locations. According to another embodiment, ductile layers such as adhesives may be disposed between the glass stacks. However, the pulsed laser process described herein will still, in a single pass, fully perforate both the upper and lower glass layers of such a stack.

Further, following the formation of the contour line 170 in the transparent workpiece 160, a stress inducing source, such as a mechanical or thermal source may be utilized to separate the transparent workpiece 160 along the contour line 170. According to embodiments, the thermal source, such as an infrared laser beam, may be used to create thermal stress and thereby separate the transparent workpiece 160 at the contour line 170. In some embodiments, an infrared laser may be used to initiate spontaneous separation and then the separation may be finished mechanically. Suitable infrared lasers to create thermal stress in glass would typically have wavelengths that are readily absorbed by glass, typically having wavelengths ranging from 1.2 microns to 13 microns, for example, a range of 4 microns to 12 microns. The infrared laser beam, such as a laser beam produced by a carbon dioxide laser (a "$CO_2$ laser"), a carbon monoxide laser (a "CO laser"), a solid state laser, a laser diode, or combinations thereof, is a controlled heat source that rapidly increases the temperature of the transparent workpiece 160 at or near the contour line 170. This rapid heating may build compressive stress in the transparent workpiece 160 on or adjacent to the contour line 170. Since the area of the heated glass surface is relatively small compared to the overall surface area of the transparent workpiece 160, the heated area cools relatively rapidly. The resultant temperature gradient induces tensile stress in the transparent workpiece 160 sufficient to propagate a crack along the contour line 170 and through the thickness of the transparent workpiece 160, resulting in full separation of the transparent workpiece 160 along the contour line 170. Without being bound by theory, it is believed that the tensile stress may be caused by expansion of the glass (i.e., changed density) in portions of the workpiece with higher local temperature.

In view of the foregoing description, it should be understood that formation of a contour line comprising defects along a desired line of separation may be enhanced by utilizing a pulsed laser beam which is shaped by an optical assembly into a phase shifted focal line such that the phase shifted focal line irradiates the transparent workpiece along the desired line of separation.

EXAMPLES

Example 1

Figure 7A:
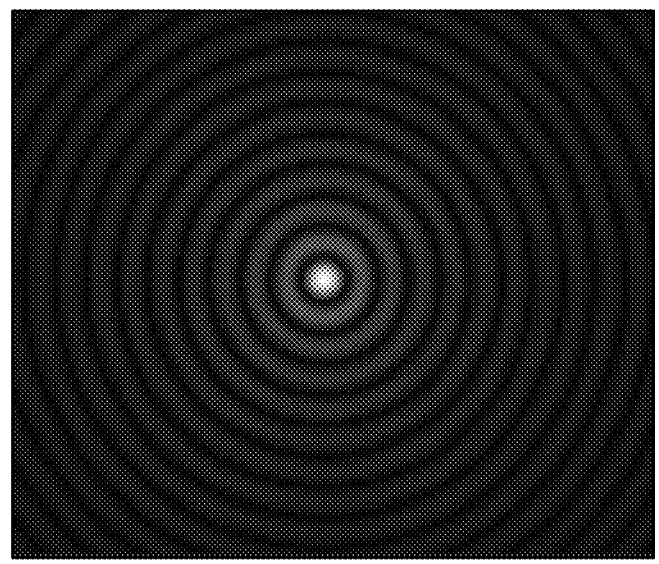
FIG. 7A depicts a cross-sectional intensity profile of a non-phase shifted focal line formed using the optical assembly of FIG. 3, according to one or more embodiments described herein.
Figure 7B:
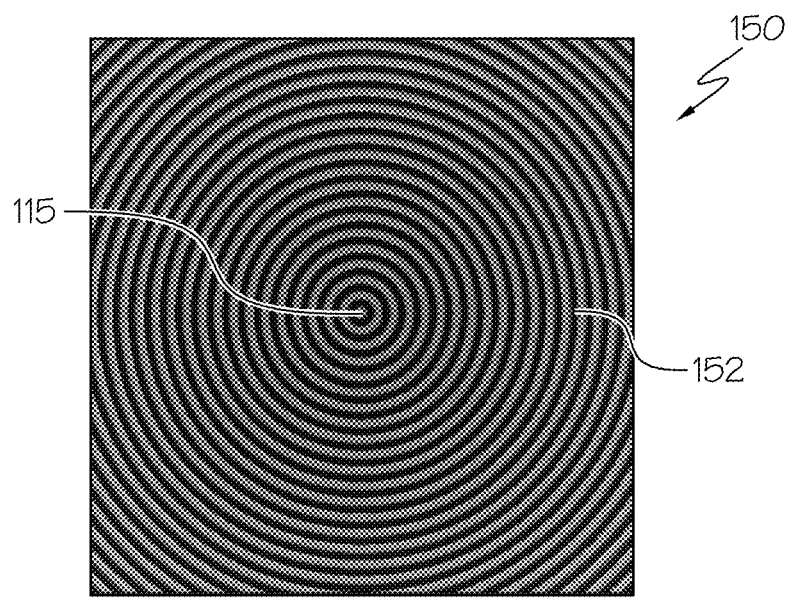
FIG. 7B depicts a cross-sectional phase contour of the non-phase shifted focal line of FIG. 7A, according to one or more embodiments described herein.
Figure 7C:
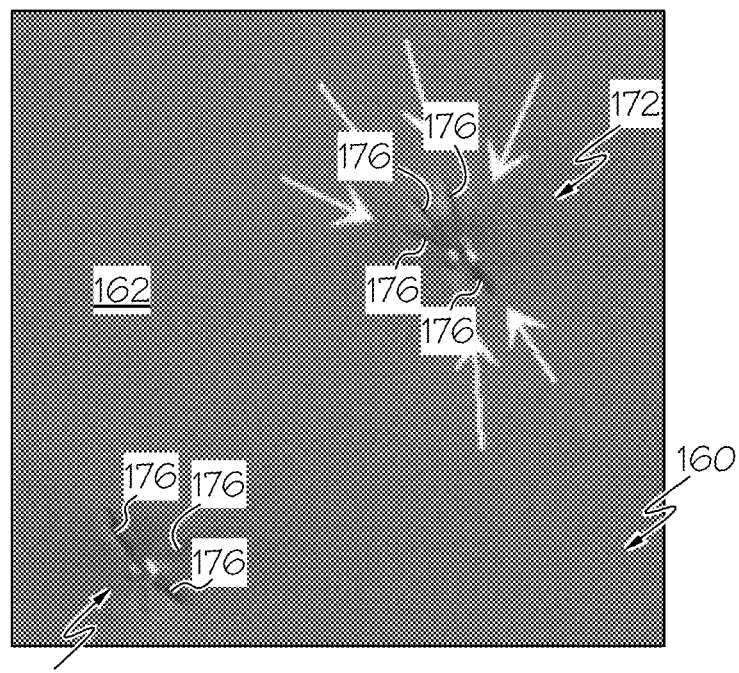
FIG. 7C depicts example defects formed in a transparent workpiece using the non-phase shifted focal line of FIGS. 7A and 7B, according to one or more embodiments described herein.

Example 1 is an experimental result of a pulsed laser beam 112 propagated through the optical assembly 100 depicted in FIG. 3 to generate the non-phase shifted focal line 113'. FIG. 7A depicts a cross-sectional intensity profile of the non-phase shifted focal line 113' and FIG. 7B depicts the cross-sectional phase contour 150 of the non-phase shifted focal line 113'. As depicted in FIGS. 7A and 7B, both the cross sectional intensity profile and the cross-sectional phase contour 150 are axisymmetric. Further, the cross-sectional phase contour 150 does not include the one or more phase contour ridges 154. Thus, the resultant defects 172 formed in the transparent workpiece 160 depicted in FIG. 7C comprise randomly oriented radial arms 176.

Example 2

Figure 8A:
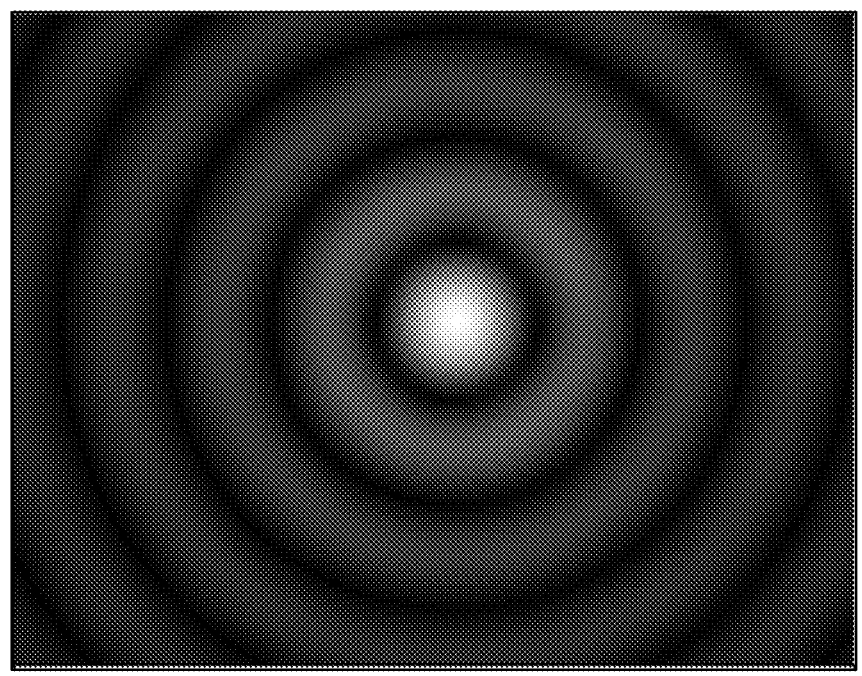
FIG. 8A depicts a cross-sectional intensity profile of a phase shifted focal line formed using the optical assembly of FIG. 5, according to one or more embodiments described herein.
Figure 8B:
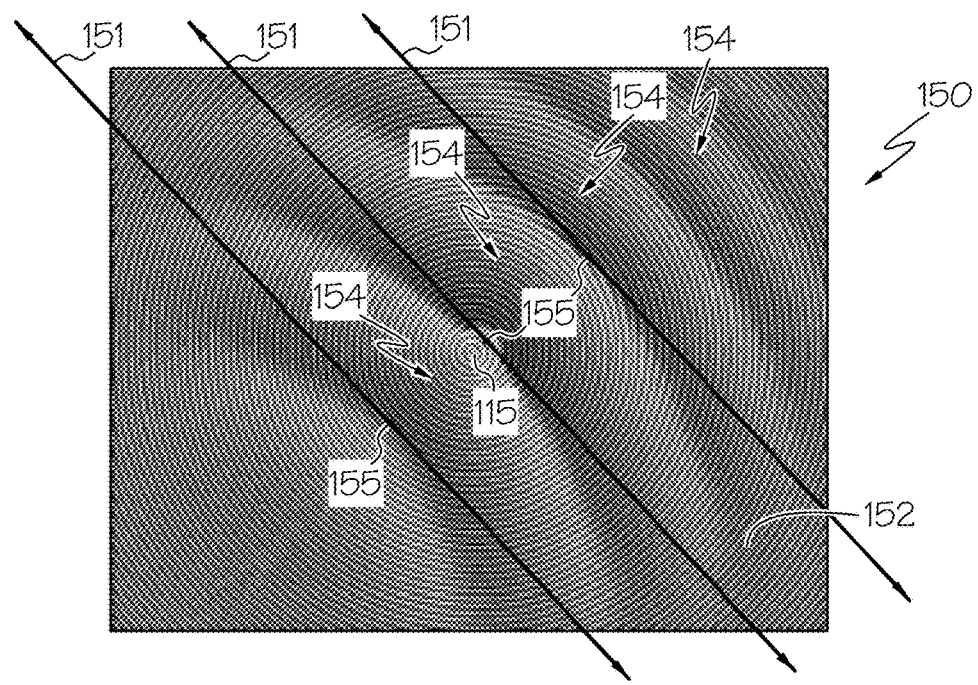
FIG. 8B depicts a cross-sectional phase contour of the phase shifted focal line of FIG. 8A, according to one or more embodiments described herein.
Figure 8C:
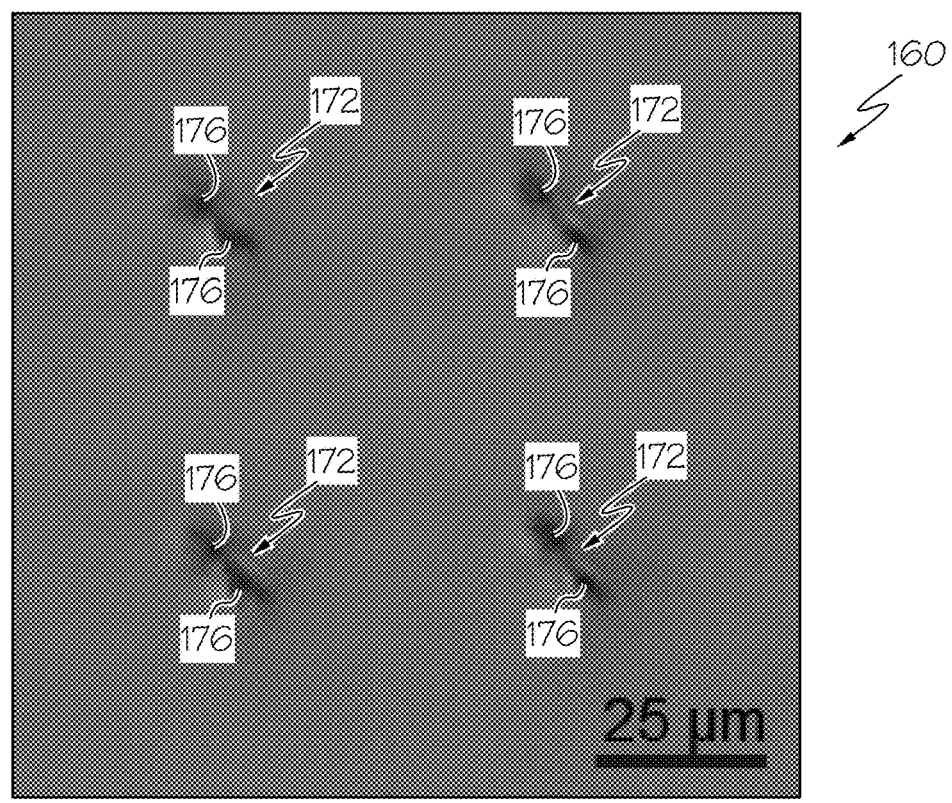
FIG. 8C depicts example defects formed in a transparent workpiece using the phase shifted focal line of FIGS. 8A and 8B, according to one or more embodiments described herein.

Example 2 is an experimental result of a pulsed laser beam 112 propagated through the optical assembly 100 depicted in FIG. 5 to generate the phase shifted focal line 113. In example 2, the first focusing lens 132 and the second focusing lens 134 are each offset about 250 μm in both the X-direction and the Y-direction such that the offset distance a of the first focusing lens 132 and the offset distance b of the second focusing lens 134 are each about 354 μm. FIG. 8A depicts a cross-sectional intensity profile of the phase shifted focal line 113 and FIG. 8B depicts the cross-sectional phase contour 150 of the phase shifted focal line 113. As depicted in FIG. 8A, the cross sectional intensity profile is axisymmetric. Further, as depicted in FIG. 8B, the cross-sectional phase contour 150 comprises the one or more phase contour ridges 154 which extend along the phase ridge lines 151 extending diagonally (e.g., in both the X-direction and the Y-direction). Thus, the resultant defects 172 formed in the transparent workpiece 160 depicted in FIG. 8C comprise radial arms 176 extending along the phase ridge lines 151.

Example 3

Figure 9A:
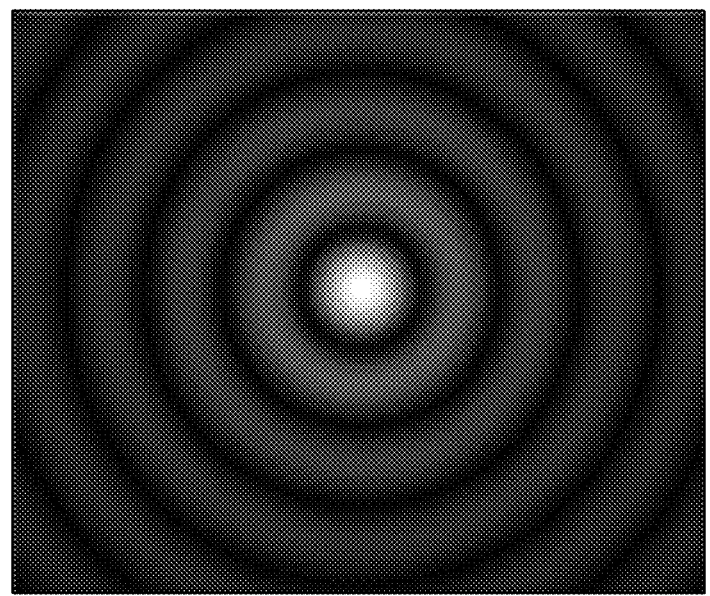
FIG. 9A depicts a cross-sectional intensity profile of another phase shifted focal line formed using the optical assembly of FIG. 5, according to one or more embodiments described herein.
Figure 9B:
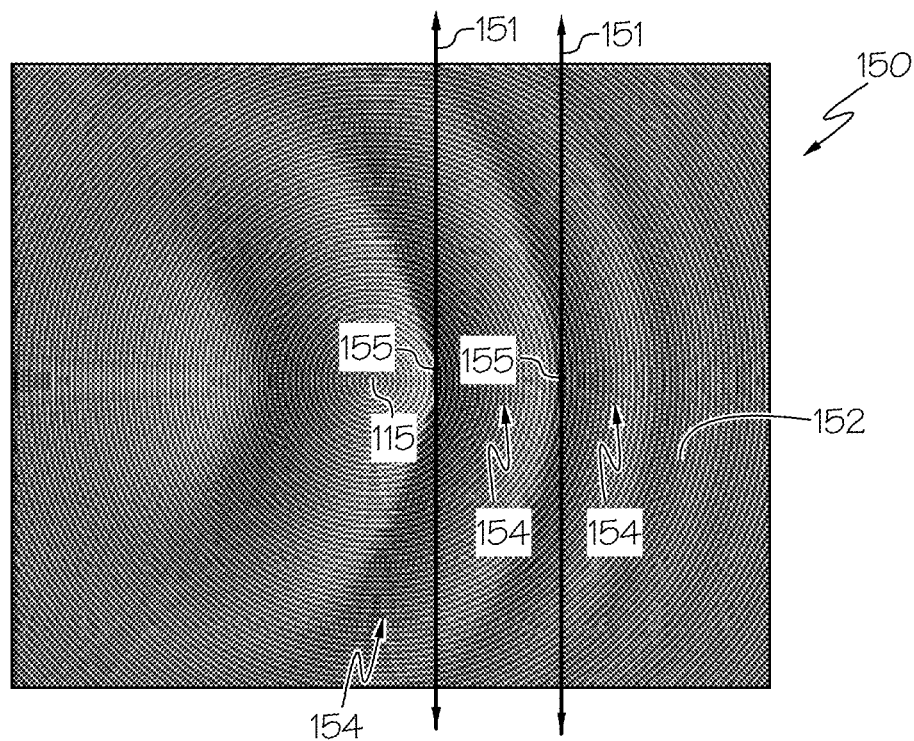
FIG. 9B depicts a cross-sectional phase contour of the phase shifted focal line of FIG. 9A, according to one or more embodiments described herein.
Figure 9C:
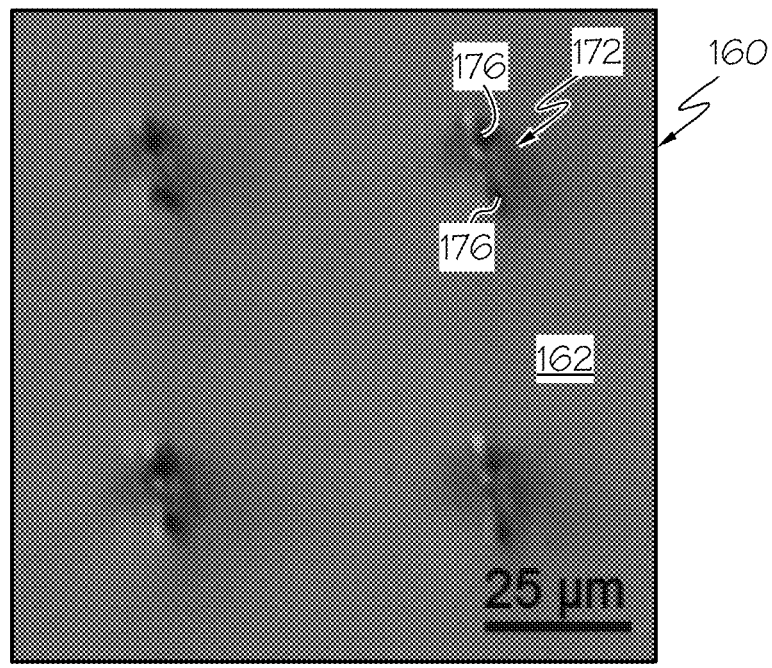
FIG. 9C depicts example defects formed in a transparent workpiece using the phase shifted focal line of FIGS. 9A and 9B, according to one or more embodiments described herein.

Example 3 is an experimental result of a pulsed laser beam 112 propagated through the optical assembly 100 depicted in FIG. 5 to generate the phase shifted focal line 113. In example 3, the first focusing lens 132 and the second focusing lens 134 are each offset about 250 μm in the X-direction such that the offset distance a of the first focusing lens 132 and the offset distance b of the second focusing lens 134 are each about 250 μm. FIG. 9A depicts a cross-sectional intensity profile of the phase shifted focal line 113 and FIG. 9B depicts the cross-sectional phase contour 150 of the phase shifted focal line 113. As depicted in FIG. 9A, the cross sectional intensity profile is axisymmetric. Further, as depicted in FIG. 9B the cross-sectional phase contour 150 comprises the one or more phase contour ridges 154 which extend along the phase ridge lines 151 extending substantially along the Y-direction. Thus, the resultant defects 172 formed in the transparent workpiece 160 depicted in FIG. 9C comprise radial arms 176 extending along the phase ridge lines 151 in the Y-direction.

Example 4

Figure 10A:
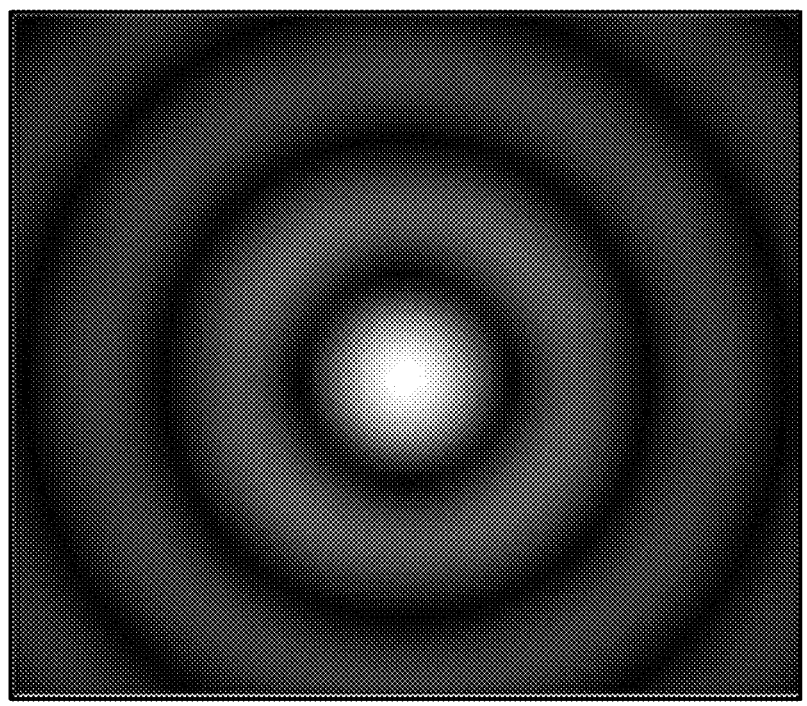
FIG. 10A depicts a cross-sectional intensity profile of a phase shifted focal line formed using the optical assembly of FIG. 4, according to one or more embodiments described herein.
Figure 10B:
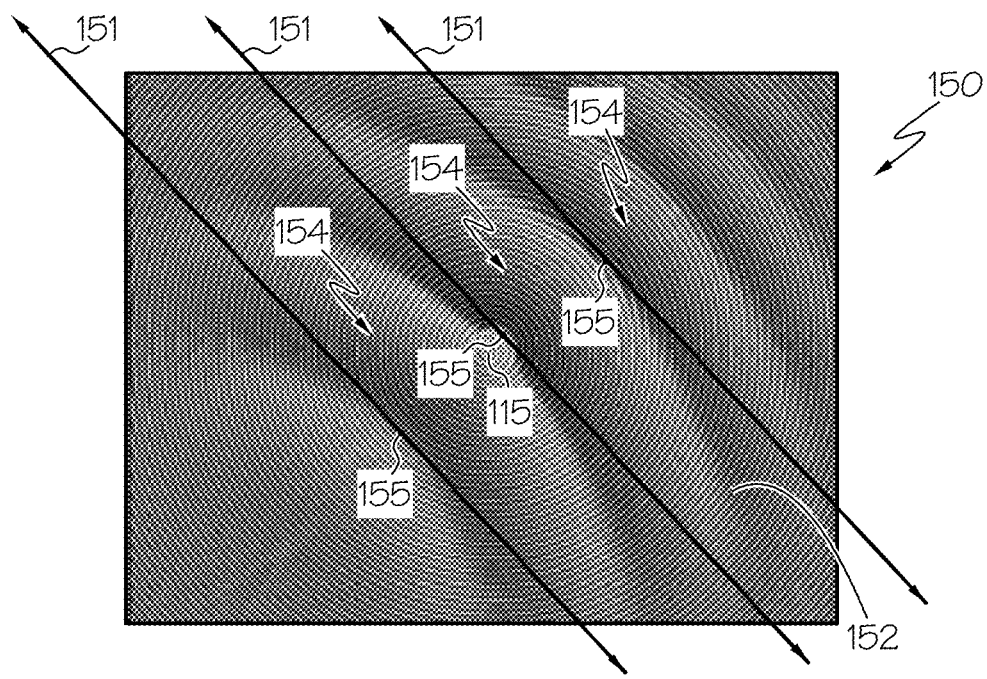
FIG. 10B depicts a cross-sectional phase contour of the phase shifted focal line of FIG. 10A, according to one or more embodiments described herein.
Figure 10C:
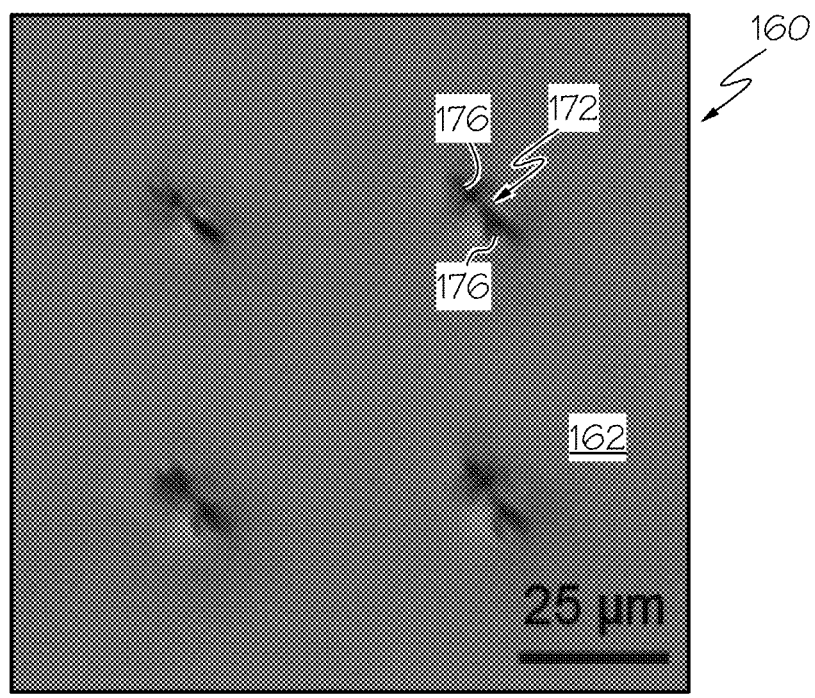
FIG. 10C depicts example defects formed in a transparent workpiece using the phase shifted focal line of FIGS. 10A and 10B, according to one or more embodiments described herein.

Example 4 is an experimental result of a pulsed laser beam 112 propagated through the optical assembly 100 depicted in FIG. 4 to generate the phase shifted focal line 113. In example 4, the first focusing lens 132 is offset about 250 μm in both the X-direction and the Y-direction such that the offset distance a is about 354 μm. FIG. 10A depicts a cross-sectional intensity profile of the phase shifted focal line 113 and FIG. 10B depicts the cross-sectional phase contour 150 of the phase shifted focal line 113. As depicted in FIG. 10A, the cross sectional intensity profile is axisymmetric. Further, as depicted in FIG. 10B, the cross-sectional phase contour 150 comprises the one or more phase contour ridges 154 which extend along the phase ridge lines 151 extending diagonally (e.g., in both the X-direction and the Y-direction). Thus, the resultant defects 172 formed in the transparent workpiece 160 depicted in FIG. 10C comprise radial arms 176 extending along the phase ridge lines 151 in both the X-direction and the Y-direction.

Example 5

Figure 11A:
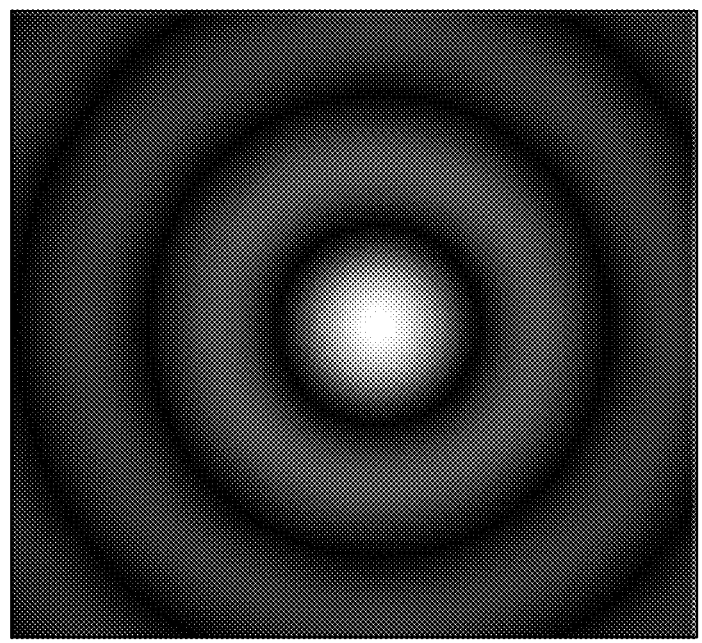
FIG. 11A depicts a cross-sectional intensity profile of a phase shifted focal line formed using the optical assembly of FIG. 4, according to one or more embodiments described herein.
Figure 11B:
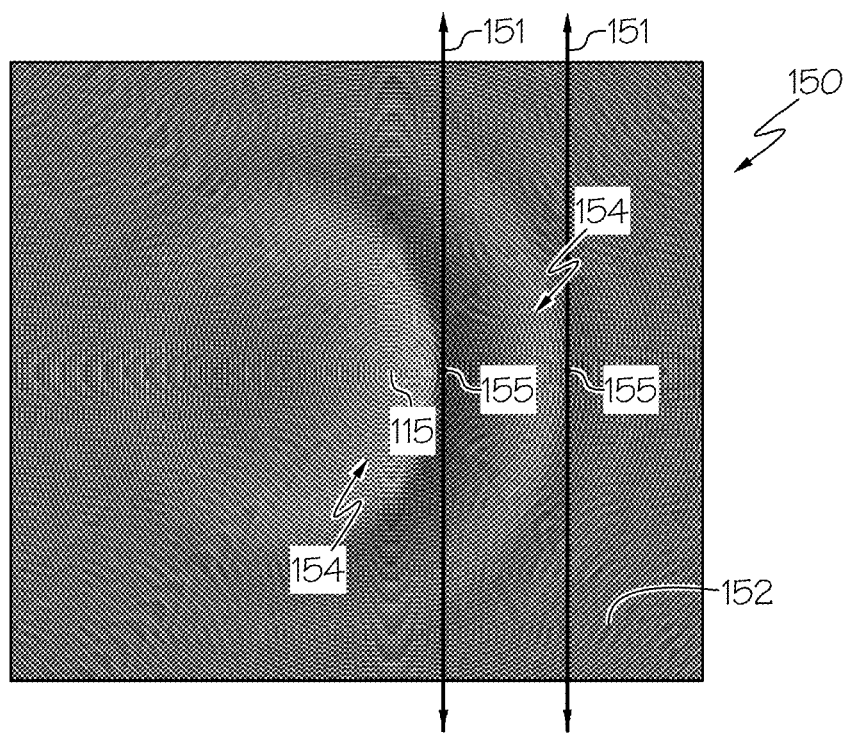
FIG. 11B depicts a cross-sectional phase contour of the phase shifted focal line of FIG. 11A, according to one or more embodiments described herein.
Figure 11C:
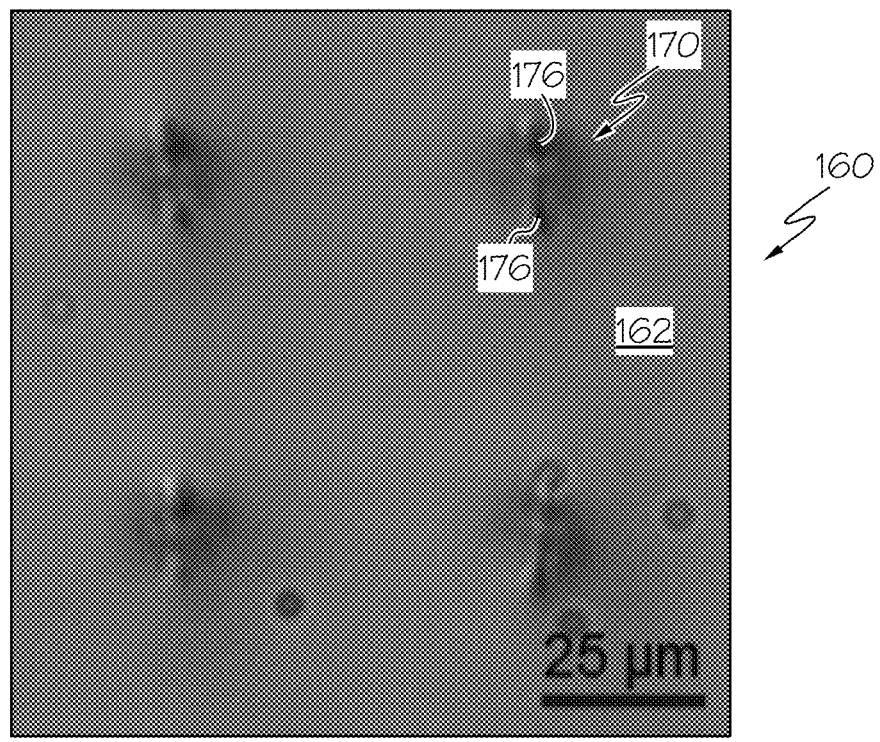
FIG. 11C depicts example defects formed in a transparent workpiece using the phase shifted focal line of FIGS. 11A and 11B, according to one or more embodiments described herein.

Example 5 is an experimental result of a pulsed laser beam 112 propagated through the optical assembly 100 depicted in FIG. 4 to generate the phase shifted focal line 113. In example 5, the first focusing lens 132 is offset about 250 µm in the X-direction such that the offset distance a of the first focusing lens 132 is about 250 µm. FIG. 11A depicts the cross-sectional intensity profile of the phase shifted focal line 113 and FIG. 11B depicts the cross-sectional phase contour 150 of the phase shifted focal line 113. As depicted in FIG. 11A, the cross-sectional intensity profile is axisymmetric. Further, as depicted in FIG. 11B, the cross-sectional phase contour 150 comprises the one or more phase contour ridges 154 which extend along the phase ridge lines 151 extending substantially along the Y-direction. Thus, the resultant defects 172 formed in the transparent workpiece 160 depicted in FIG. 11C comprise radial arms 176 extending along the phase ridge lines 151 in the Y-direction.

Example 6

Figure 12A:
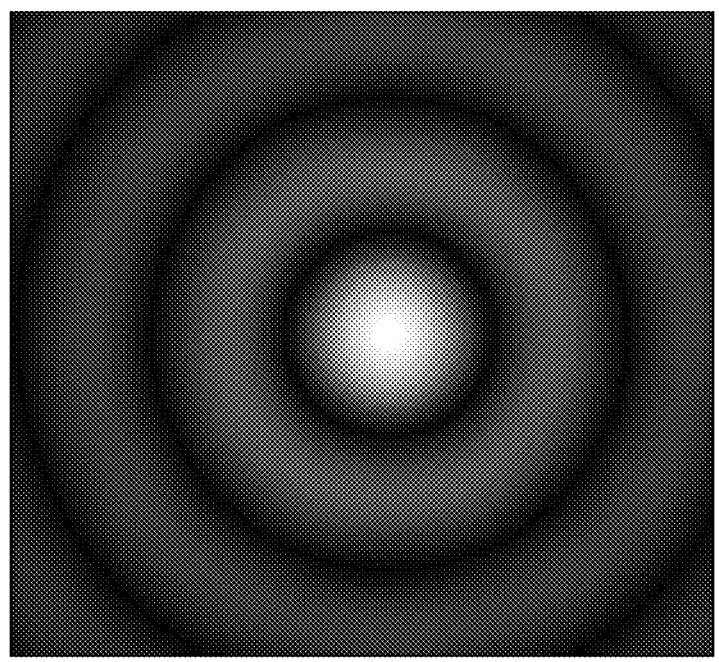
FIG. 12A depicts a cross-sectional intensity profile of a phase shifted focal line formed using the optical assembly of FIG. 4, according to one or more embodiments described herein.
Figure 12B:
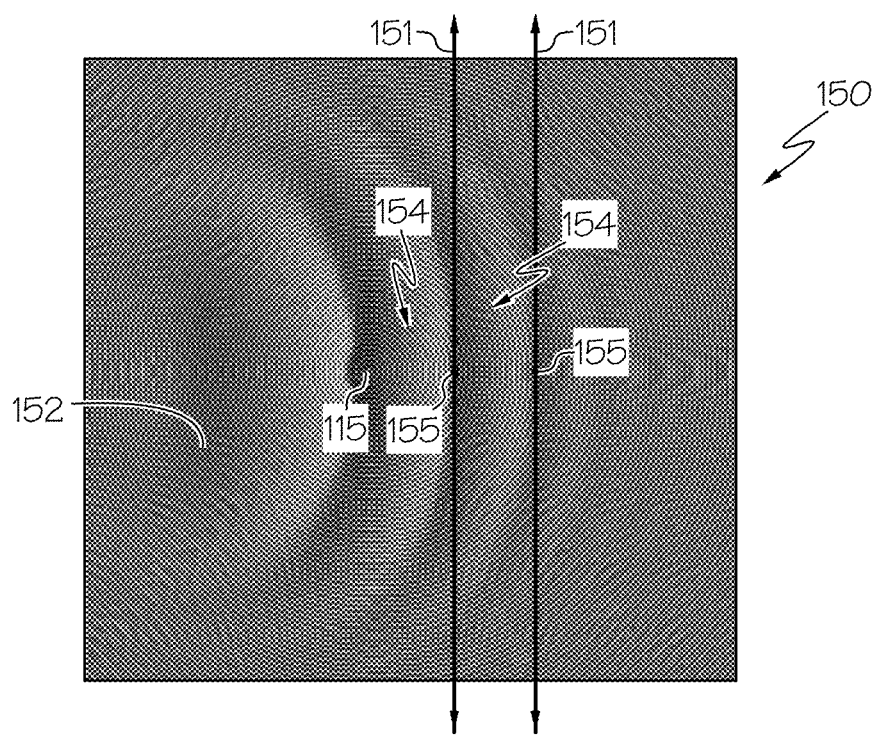
FIG. 12B depicts a cross-sectional phase contour of the phase shifted focal line of FIG. 12A, according to one or more embodiments described herein.
Figure 12C:
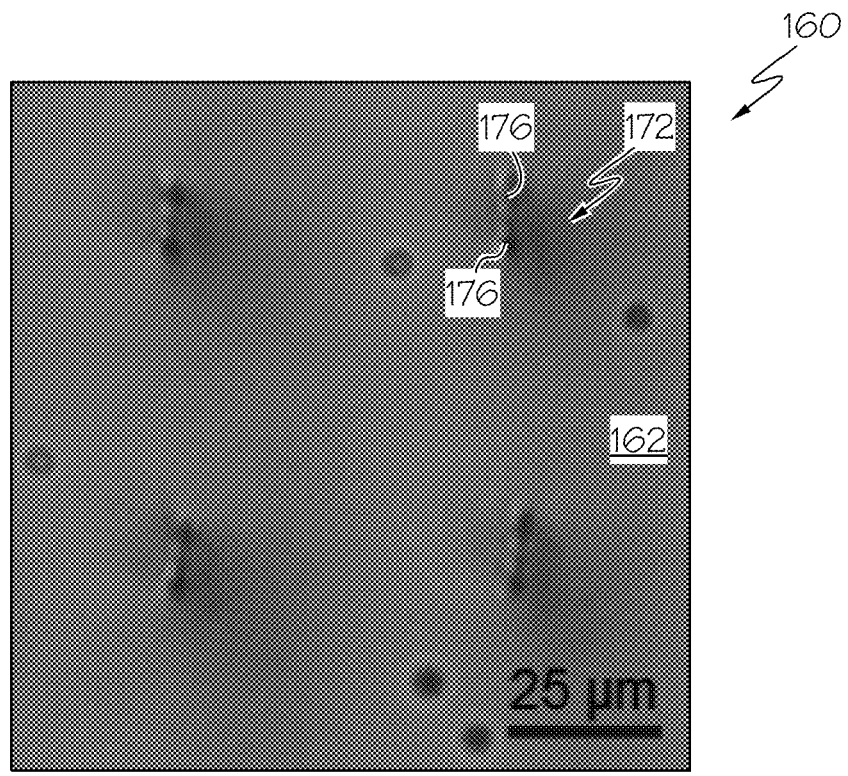
FIG. 12C depicts example defects formed in a transparent workpiece using the phase shifted focal line of FIGS. 12A and 12B, according to one or more embodiments described herein.

Example 6 is an experimental result of a pulsed laser beam 112 propagated through the optical assembly 100 depicted in FIG. 4 to generate the phase shifted focal line 113. In example 6, the first focusing lens 132 is offset about 500 µm in the X-direction such that the offset distance a of the first focusing lens 132 is about 500 µm. FIG. 12A depicts the cross-sectional intensity profile of the phase shifted focal line 113 and FIG. 12B depicts the cross-sectional phase contour 150 of the phase shifted focal line 113. As depicted in FIG. 12A, the cross-sectional intensity profile is axisymmetric. Further, as depicted in FIG. 12B, the cross-sectional phase contour 150 comprises the one or more phase contour ridges 154 which extend along the phase ridge lines 151 extending substantially along the Y-direction. Thus, the resultant defects 172 formed in the transparent workpiece 160 depicted in FIG. 12C comprise radial arms 176 extending along the phase ridge lines 151 in the Y-direction. Further, as depicted in FIG. 12B, by increasing the offset distance a of the first focusing lens 132, the spacing between adjacent phase contour ridges 154 decreases.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for laser processing a transparent workpiece, the method comprising:
    forming a contour line in the transparent workpiece, the contour line comprising defects in the transparent workpiece, wherein forming the contour line comprises:
        directing a pulsed laser beam oriented along a beam pathway and output by a beam source through a beam converting element; and
        directing the pulsed laser beam through a phase modifying optical element and into the transparent workpiece such that a portion of the pulsed laser beam directed into the transparent workpiece comprises a phase shifted focal line having a cross-sectional phase contour transverse a beam propagation direction of the pulsed laser beam, wherein:
            the cross-sectional phase contour comprises one or more phase contour ridges induced by the phase modifying optical element, the one or more phase contour ridges extending along one or more phase ridge lines; and
            the phase shifted focal line generates an induced absorption within the transparent workpiece, the induced absorption producing a defect within the transparent workpiece comprising a central defect region and at least one radial arm that extends outward from the central defect region in a radial defect direction oriented within 20° of the one or more phase ridge lines of the phase shifted focal line.

2. The method of claim 1, wherein the radial defect direction is oriented within 5° of the one or more phase ridge lines of the phase shifted focal line.

3. The method of claim 1, wherein the radial defect direction is parallel to the one or more phase ridge lines of the phase shifted focal line.

4. The method of claim 1, wherein the phase modifying optical element comprises a lens positioned offset in a radial offset direction from the beam pathway.

5. The method of claim 4, wherein:
the lens comprises a focusing lens;
an expanding lens and a collimating lens are each positioned along the beam pathway between the beam source and the focusing lens; and
the expanding lens is positioned between the beam source and the collimating lens and the collimating lens is positioned between the expanding lens and the focusing lens.

6. The method of claim 4, the method further comprising:
translating the lens about the beam pathway; and
translating the transparent workpiece and the pulsed laser beam relative to each other along the contour line, thereby laser forming a plurality of defects along the contour line within the transparent workpiece such that a portion of the contour line comprises a curvature along an imaging surface of the transparent workpiece.

7. The method of claim 1, further comprising translating the transparent workpiece and the pulsed laser beam relative to each other along the contour line, thereby laser forming a plurality of defects along the contour line within the transparent workpiece.

8. The method of claim 7, further comprising directing an infrared laser beam onto the transparent workpiece along or near the contour line to separate the transparent workpiece along the contour line.

9. The method of claim 1, wherein the phase shifted focal line comprises a leading portion phase shifted from a trailing portion such that the leading portion of the phase shifted focal line irradiates the transparent workpiece before the trailing portion of the phase shifted focal line irradiates the transparent workpiece.

10. The method of claim 1, wherein the phase shifted focal line projects a non-axisymmetric beam spot onto an imaging surface of the transparent workpiece.

11. The method of claim 1, wherein the portion of the pulsed laser beam directed into the transparent workpiece comprises:
a wavelength $\lambda$;
an effective spot size $w_{o,eff}$; and
a cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor comprising a value of 10 or greater.

12. The method of claim 11, wherein the dimensionless divergence factor $F_D$ comprises a value of from about 50 to about 1500.

13. The method of claim 1, wherein the beam converting element comprises an aspheric optical element, an annular aperture, or both.

14. The method of claim 13, wherein the aspheric optical element comprises a refractive axicon, a reflective axicon, negative axicon, a spatial light modulator, a diffractive optic, or a cubically shaped optical element.

15. A method for laser processing a transparent workpiece, the method comprising:
localizing a pulsed laser beam in the transparent workpiece, the pulsed laser beam propagating along an optical pathway in a beam propagation direction and comprising:
a pulse energy and pulse duration sufficient to exceed a damage threshold of the transparent workpiece; and
a phase shifted focal line that projects an axisymmetric beam spot onto an imaging surface of the transparent workpiece and comprises a cross-sectional phase contour at the axisymmetric beam spot, wherein:
the cross-sectional phase contour comprises one or more phase contour ridges extending along the cross-sectional phase contour along one or more phase ridge lines; and
the phase shifted focal line generates an induced absorption within the transparent workpiece, the induced absorption producing a defect within the transparent workpiece comprising a central defect region and at least one radial arm that extends outward from the central defect region in a radial defect direction oriented within 20° of the one or more phase ridge lines of the phase shifted focal line.

16. The method of claim 15, further comprising directing the pulsed laser beam through a lens positioned offset a beam pathway in a radial offset direction.

17. The method of claim 15, further comprising directing the pulsed laser beam through a beam converting element, the beam converting element comprising an aspheric optical element, an annular aperture, or both.

18. The method of claim 17, wherein a portion of the pulsed laser beam directed into the transparent workpiece comprises:
a wavelength $\lambda$;
a spot size $w_o$; and
a cross section that comprises a Rayleigh range $Z_R$ that is greater than $$F_D \frac{\pi w_0^2}{\lambda},$$

where $F_D$ is a dimensionless divergence factor comprising a value of 10 or greater.

19. The method of claim 15, further comprising translating the transparent workpiece and the pulsed laser beam relative to each other along a contour line, thereby laser forming a plurality of defects along the contour line within the transparent workpiece.

20. A method for laser processing a transparent workpiece, the method comprising:
forming a contour line in the transparent workpiece, the contour line comprising defects in the transparent workpiece, wherein forming the contour line comprises:
directing a pulsed laser beam oriented along a beam pathway and output by a beam source through an aspheric optical element; and
directing the pulsed laser beam through a phase modifying optical element and into the transparent workpiece such that a portion of the pulsed laser beam directed into the transparent workpiece comprises a phase shifted focal line having a cross-sectional phase contour, wherein:
the phase shifted focal line comprises a leading portion phase shifted from a trailing portion such that the leading portion of the phase shifted focal line irradiates the transparent workpiece before the trailing portion of the phase shifted focal line irradiates the transparent workpiece;
the phase shifted focal line generates an induced absorption within the transparent workpiece, the induced absorption producing a defect within the transparent workpiece comprising a central defect region and at least one radial arm that extends outward from the central defect region in a radial defect direction; and
the phase shifted focal line projects an axisymmetric beam spot onto an imaging surface of the transparent workpiece.

21. The method of claim 20, wherein the phase modifying optical element comprises a lens positioned offset in a radial offset direction from the beam pathway.

22. The method of claim 20, further comprising translating the transparent workpiece and the pulsed laser beam relative to each other along the contour line, thereby laser forming a plurality of defects along the contour line within the transparent workpiece.

23. The method of claim 20, wherein:
the leading portion of the phase shifted focal line corresponds with one or more phase contour ridges of the cross-sectional phase contour when the leading portion of the phase shifted focal line irradiates the transparent workpiece;
the one or more phase contour ridges extend along one or more phase ridge lines; and
the radial defect direction of the at least one radial arm oriented within 20° of the one or more phase ridge lines of the phase shifted focal line.

24. The method of claim 20, wherein the portion of the pulsed laser beam directed into the transparent workpiece comprises:
a wavelength $\lambda$;
a spot size $w_o$; and
a cross section that comprises a Rayleigh range $Z_R$ that is greater than $$F_D \frac{\pi w_0^2}{\lambda},$$

where $F_D$ is a dimensionless divergence factor comprising a value of 10 or greater.

* * * * *

UNITED STATES PATENT AND TRADEMARK OFFICE
CERTIFICATE OF CORRECTION

PATENT NO. : 10,688,599 B2
APPLICATION NO. : 15/874004
DATED : June 23, 2020
INVENTOR(S) : Anping Liu et al.

Page 1 of 1

It is certified that error appears in the above-identified patent and that said Letters Patent is hereby corrected as shown below:

On the Title Page

On page 5, in Column 2, item (56), Other Publications, Line 38, delete "pluse" and insert -- pulse --, therefor.

On page 5, in Column 2, item (56), Other Publications, Line 61, delete "-achitecture," and insert -- -architecture, --, therefor.

On page 6, in Column 1, item (56), Other Publications, Line 2, after "Soc." insert -- Am. --.

On page 6, in Column 1, item (56), Other Publications, Line 23, delete "Egineering" and insert -- Engineering --, therefor.

Signed and Sealed this
Twenty-second Day of September, 2020

Andrei Iancu
*Director of the United States Patent and Trademark Office*